United States Patent
Marbach et al.

(10) Patent No.: US 8,593,953 B2
(45) Date of Patent: Nov. 26, 2013

(54) SYSTEM AND METHOD FOR CONTROLLING DATA TRANSMISSION IN A MULTIHOP WIRELESS NETWORK

(75) Inventors: Peter Marbach, Toronto (CA); Mahdi Lotfinezhad, Toronto (CA)

(73) Assignee: White Squirrel Wireless Technologies Inc., Toronto (CA)

( * ) Notice: Subject to any disclaimer, the term of this patent is extended or adjusted under 35 U.S.C. 154(b) by 346 days.

(21) Appl. No.: 12/978,151

(22) Filed: Dec. 23, 2010

(65) Prior Publication Data

US 2012/0163199 A1    Jun. 28, 2012

(51) Int. Cl.
   *H04L 12/26*    (2006.01)
(52) U.S. Cl.
   USPC .......................... 370/230; 370/252; 370/328
(58) Field of Classification Search
   USPC ......... 370/216, 229, 230, 235, 236, 252, 310, 370/322, 329, 328
   See application file for complete search history.

(56) References Cited

U.S. PATENT DOCUMENTS

| | | | |
|---|---|---|---|
| 2008/0171550 A1* | 7/2008 | Zhao ............................. | 455/445 |
| 2009/0219818 A1* | 9/2009 | Tsuchiya ...................... | 370/236 |
| 2009/0296575 A1* | 12/2009 | Nakai ........................... | 370/230 |
| 2010/0118698 A1* | 5/2010 | Yokobori et al. ............. | 370/230 |
| 2010/0177637 A1* | 7/2010 | Kadambi et al. ............. | 370/235 |

OTHER PUBLICATIONS

Lotfinezhad, M. and Marbach, P.; "Delay performance of CSMA policies in multihop wireless networks: A new perspective"; Information Theory and Applications Workshop (ITA), San Diego, Jan. 31 to Feb. 5, 2010; pp. 1 to 8; ISBN: 978-1-4244-7012-9.

Lotfinezhad, M. and Marbach, P.; "Throughput-delay trade-off of CSMA policies in Wireless Networks"; 2010 IEEE Information Theory Workshop (ITW), Cairo, Jan. 6 to 8, 2010; pp. 1 to 2; ISBN: 978-1-4244-6372-5.

Marbach, P. et al.; "Achievable Rate Region of CSMA Schedulers in Wireless Networks with Primary Interference Constraints"; Proceedings of the 46th IEEE Conference on Decision and Control; Dec. 12 to 14, 2007; pp. 1156 to 1161; New Orleans, LA.

Durvy, M. et al.; "Self-Organization Properties of CSMA/CA Systems and Their Consequences on Fairness"; Mar. 2009; pp. 931 to 943; vol. 55, No. 3; IEEE Transactions on Information Theory.

Wu, X. et al.; "Regulated Maximal Matching: A Distributed Scheduling Algorithm for Multi-Hop Wireless Networks With Node-Exclusive Spectrum Sharing"; Proceedings of the 44th IEEE Conference on Decision and Control, and the European Control Conference 2005; Dec. 12 to 15; pp. 5342 to 5347; Seville, Spain.

(Continued)

*Primary Examiner* — Kwang B Yao
*Assistant Examiner* — Nguyen Ngo
(74) *Attorney, Agent, or Firm* — Wilfred P. So; Blake, Cassels & Graydon LLP.

(57) ABSTRACT

Systems and methods are provided for media access control and rate control to improve data throughput in multihop wireless networks. For controlling media access, an unlocking mechanism is provided that sets the unlocking times at which the scheduling patterns of a MAC protocol is unlocked by requiring all, or a subset of links, to stop transmitting. The unlocking times are set and updated according to quality of service requirements which may change over time. Parameters of the MAC protocol and packet arrivals rates to the links in the network are updated using the parameters of the unlocking mechanism, the queue-sizes, and the utility functions of the links in the network.

32 Claims, 14 Drawing Sheets

(56) References Cited

OTHER PUBLICATIONS

Lin, X. et al.; "The Impact of Imperfect Scheduling on Cross-Layer Congestion Control in Wireless Networks"; IEEE/ACM Transactions on Networking; Apr. 2006; vol. 14, No. 2.

Gaunt, D.S. et al.; "Hard-Sphere Lattice Gases. I. Plane-Square Lattice"; The Journal of Chemical Physics; Oct. 15, 1965; pp. 2840 to 2863; vol. 43, No. 8.

Jiang, L. et al.; "A Distributed Algorithm for Maximal Throughput and Optimal Fairness in Wireless Networks with a General Interference Model"; EECS Department, University of California at Berkeley; Apr. 15, 2008; Available online at http://www.eecs.berkeley.edu/Pubs/TechRpts/2008/EEECS-2008-38.html.

Rajagopalan, S. et al.; "Network Adiabatic Theorem: An Efficient Randomized Protocol for Contention Resolution"; Proceedings of the eleventh international joint conference on Measurement and modeling of computer systems; 2009; pp. 133 to 144; in SIGMETRICS/Performance '09; Jun. 15 to 19, 2009; Seattle, WA.

Lotfinezhad, M. et al.; "On Channel Access Delay of CSMA Policies in Wireless Networks with Primary Interference Constraints"; in Allerton Conference; Oct. 2009.

Durvy, M. et al.; "Border Effects, Fairness, and Phase Transition in Large Wireless Networks"; in IEEE INFOCOM '08; pp. 601 to 609; Apr. 2008.

Borgs, C. et al.; "Torpid Mixing of Some Monte Carlo Markov Chain Algorithms in Statistical Physics"; in $40^{th}$ Annual Symposium on Foundations of Computer Science; 1999; pp. 218 to 229.

Garetto, M. et al.; "Modeling Per-flow Throughput and Capturing Starvation in CSMA Multi-hop Wireless Networks"; IEEE/ACM Transactions on Networking; 2008; pp. 864 to 877; vol. 16, No. 4.

Lee, J.-W. et al.; "Utility-Optimal Random-Access Control"; IEEE Transactions on Wireless Communications; Jul. 2007; pp. 2741 to 2751; vol. 6, No. 7.

Bordenave, C. et al.; "Performance of Random Medium Access Control an Asymptotic Approach"; in SIGMETRICS '08: Proceedings of the 2008 ACM SIGMETRICS international conference on Measurement and modeling of computer systems; 2008; p. 1 to 12.

Ni, J. et al.; "Distributed CSMA/CA Algorithms for Achieving Maximum Throughput in Wireless Networks"; 2009; Available online at http://arxiv.org/PS_cache/arxiv/pdf/0901/0901.2333v1.pdf.

Shah, D. et al.; "Hardness of low delay network scheduling"; Aug. 8, 2009; Online at http://www.mit.edu/_devavrat/harddelay.pdf.

Yi, Y. et al.; "Complexity in Wireless Scheduling: Impact and Tradeoffs"; in ACM MobiHoc'08, May 26 to 30, Hong Kong; 2008; ACM.

Goldberg, L. A. et al.; "A bound on the capacity of backoff and acknowledgement-based protocols"; Research Report 365; Department of Computer Science, University of Warwick; Mar. 24, 2000.

Abramson, N. ; "The Aloha System—Another alternative for computer communications"; in AFIPS '70 (Fall): Proceedings of the Nov. 17 to 19 fall joint computer conference; 1070; pp. 281 to 285; ACM.

Eryilmaz, A. et al.; "Stable Scheduling Policies for Fading Wireless Channels"; Apr. 2005; pp. 411 to 424; IEEE/ACM Transactions on Networking; vol. 13, No. 2.

Stolyar, A. L. et al.; "Dynamic Distributed Scheduling in Random Access Networks"; Journal of Applied Probability; 2008; pp. 297 to 313; vol. 45, No. 2.

Neely, M. et al.; "Dynamic Power Allocation and Routing for Time-Varying Wireless Networks"; IEEE Journal on Selected Areas in Communication; Jan. 2005; pp. 89 to 103; vol. 23, No. 1.

Hajek, B. et al.; "Decentralized Dynamic Control of a Multiaccess Broadcast Channel"; IEEE Transactions on Automatic Control; Jun. 1982; 559 to 569; vol. 27, No. 3.

Rad, A. H. M. et al.; "Utility-optimal Random Access without Message Passing"; IEEE Transactions on Wireless Communications; Mar. 2009; pp. 1073 to 1079; vol. 8, No. 3.

Joo, C. et al; "Understanding the Capacity Region of the Greedy Maximal Scheduling Algorithm in Multihop Wireless Networks"; in proceedings of IEEE INFOCOM'08; Apr. 2008; IEEE/ACMTransactions on Networking; Aug. 2009; pp. 1132 to 1145; vol. 17, No. 4.

Hastad, J. et al.; "Analysis of Backoff Protocols for Multiple Access Channels"; SIAM Journal on Computing; 1996; vol. 25, No. 4.

Tassiulas, L. et al.; "Stability Properties of Constrained Queueing Systems and Scheduling Policies for Maximum Throughput in Multihop Radio Networks"; IEEE Transactions on Automatic Control; Dec. 1992; pp. 1936 to 1948; vol. 37, No. 12.

Proutiere, A. et al.; "Resource Allocation over Network Dynamics without Timescale Separation"; in proceedings of IEEE INFOCOM'10; 2010.

Le, L. B. et al.; "Delay Analysis of Maximum Weight Scheduling in Wireless Ad Hoc Networks"; in proceedings of 43rd Annual Conference on Information Sciences and Systems, CISS'09; Mar. 2009; pp. 389 to 394.

Gupta, G. R. et al.; "Delay Analysis for Wireless Networks With Single Hop Traffic and General Interference Constraints"; IEEE/ACM Transactions on Networking; Apr. 2010; pp. 393 to 405; vol. 18, No. 2.

Baccelli, F. et al.; "An Aloha Protocol for Multihop Mobile Wireless Networks"; IEEE Transactins on Information Theory; Feb. 2006; pp. 421 to 436; vol. 52, No. 2.

Jiang, L. et al.; "Approaching Throughput-Optimality in a Distributed CSMA Algorithm: Collisions and Stability"; in proceedings of ACM MobiHoc $S^3$ '09; May 2009.

Bianchi, G.; "Performance Analysis of the IEEE 802.11 Distributed Coordination Function"; IEEE Journal on Selected Areas in Communications; Mar. 2000; pp. 535 to 547; vol. 18, No. 3.

Neely, M. J. et al.; "Fairness and Optimal Stochastic Control for Heterogeneous Networks"; IEEE/ACM Transactions on Networking; Apr. 2008; pp. 396 to 409; vol. 16, No. 2.

Neely, M. J.; "Delay Analysis for Maximal Scheduling With Flow Control in Wreless Networks with Bursty Traffic"; IEEE/ACM Transactions on Networking; Aug. 2009; pp. 1146 to 1159; vol. 17, No. 4.

Benaim, M. et al.; "A Class of Mean Field Interaction Models for Computer and Communication Systems"; EPFL; Technical Report LCA-Report-2008-010; May 2009.

Ghaderi, J. et al.; "On the Design of Efficient CSMA Algorithms for Wireless Networks"; 2010; Online at http://arxiv.org/abs/1003.1364v1.

Vigoda, E.; "A Note on the Glauber Dynamics for Sampling Independent Sets"; The Electronic Journal of Combinatorics; 2001; vol. 8.

Sharma, G. et al.; "On the Complexity of Scheduling in Wireless Networks"; in proceedings of the12th annual international conference on Mobile computing and networking (MobiCom'06); 2006; pp. 227 to 238.

Buche, R. et al.; "Control of Mobile Communication Systems With Time-Varying Channels in Heavy Traffic"; IEEE Transactions on Automatic Control; Jun. 2002; pp. 992 to 1003; vol. 47, No. 6.

Zussman, G. et al.; "Multihop Local Pooling for Distributed Throughput Maximization in Wireless Networks"; in proceedings of IEEE INFOCOM 2008; Apr. 2008; pp. 1139 to 1147.

Hunt, H. B. et al.; "NC-Approximation schemes for NP and PSPACE—Hard Problems for Geometric Graphs"; Journal of Algorithms; 1988; pp. 238 to 274; vol. 26, No. 2.

Peters, H. P. et al. "Radius, Perimeter, and Density Profile for Percolation Clusters and Lattice Animals"; Zeitschrift für Physik B; Condensed Matter; Dec. 1979; pp. 399 to 408; vol. 34, No. 4.

Jullien, R. et al.; "Scaling properties of the surface of the Eden model in d=2, 3, 4"; Journal of Physics A: Mathematical and General; 1985; pp. 2279 to 2287; vol. 18, No. 12.

Sanghavi, S. et al.; "Distributed Link Scheduling with Constant Overhead"; in proceedings of SIGMETRICS'07, Jun. 12 to 16, 2007, San Diego, U.S.A.

Shah, D. et al.; "Delay Optimal Queue-Based CSMA"; in proceedings of SIGMETRICS'10, Jun. 14 to 18, 2010, New York, U.S.A.

Dimakis, A. et al.; "Sufficient Conditions for Stability of Longest-Queue-First Scheduling: Second-Order Properties Using Fluid Limits"; Advances in Applied Probability; 2006; pp. 505 to 521; vol. 38, No. 2; Applied Probability Trust.

(56) References Cited

OTHER PUBLICATIONS

Kelly, F.P.; et al.; "The Number of Packets Transmitted by Collision Detect Random Access Schemes"; The Annals of Probability; 1987; pp. 1557 to 1568; vol. 15, No. 4.

Lotfinezhad M. et al. ; "Throughput-Optimal Random Access with Order-Optimal Delay"; CoRR, abs/1009.5944; Sep. 2010; http://arxiv.org/abs/1009.5944.

* cited by examiner

SYSTEM AND METHOD FOR CONTROLLING DATA TRANSMISSION IN A MULTIHOP WIRELESS NETWORK

TECHNICAL FIELD

The following relates generally to wireless communications, and more particularly to controlling data transmission in a wireless network.

DESCRIPTION OF THE RELATED ART

Wireless networks refers to any network where nodes use a wireless medium to send and receive data. For data communication, the wireless medium is generally logically divided into one or more wireless channels. In this case data communication takes places within wireless channels, whereby data that is sent on one wireless channel can only be received on the same wireless channel. Nodes in a wireless network generally have some specialized hardware and software that allows them to send and receive data over a wireless channel. This specialized hardware is generally implemented on a wireless card that is part of the node. It can be appreciated that a wireless node comprises one or more wireless cards.

Examples of nodes in a wireless network include wireless communication devices, wireless routers, wireless access points, etc.

Wireless cards are also referred to as a wireless network interface or a wireless network adapter. Wireless cards can interface directly with each others to form wireless links. A wireless link is defined by a sender wireless card and a receiver wireless card, and a wireless channel that is used by the sender wireless card to transmit data to the receiver wireless card.

A characteristic of wireless networks is that concurrent data transmissions on two wireless links that use the same channel can interfere with each other. In this case, the data transmission on one or both wireless links can be corrupted in such a way that is not possible for the receiver card to properly receive the data. Therefore, an important problem for wireless networks is to implement a protocol that controls data transmissions in order to avoid that wireless links that interfere with each other are transmitting data at the same time.

Generally, the protocols that control data transmissions in a wireless network are implemented in the form of a media access control (MAC) data communication protocol. The MAC protocol controls when and how a data transmission over a wireless link is initiated.

Generally, wireless network data is transmitted in the form of data packets. Data packets that are transmitted in a wireless network can be of different sizes and, in many cases, are not allowed to exceed a maximum size in terms of the total number of bits that they contain.

A common way to classify wireless networks is to distinguish between one-hop and multihop wireless networks. In one-hop wireless networks, such as cellular wireless networks, data is usually transmitted via a wireless link only on the last link between a wireless base station and the wireless end system, or a wireless access point and the wireless end system. In multihop wireless networks, there can be one or more intermediate nodes along the path that receive and forward data packets via wireless links. Multihop wireless networks have several benefits. Compared with one-hop wireless networks, multihop wireless networks can extend the coverage of a network and improve connectivity. Moreover, transmission over multiple "short" links might require less transmission power and energy than that required over "long" links. Moreover, they enable higher data rates resulting in higher throughput and more efficient use of the wireless medium. Multihop wireless networks avoid wide deployment of cables and can be quickly deployed in a cost efficient way. In case of dense multihop wireless networks, several paths might become available that can be used to increase robustness of the network.

For multihop wireless networks, it is typically desirable that the MAC protocol is implemented in a distributed way rather than in a centralized way, since having a centralized controller to centrally control the wireless network is often costly and not practical.

Multihop wireless networks can support a variety of applications. Many of such applications include, for example, real-time video streaming and Internet telephony, which require low packet delay. To practically implement Internet telephony it is desired that the typical packet delay be, for example, in the range of 100 ms-200 ms. However, low or short packet delay times are difficult to support using known distributed MAC protocols in multihop wireless networks, that is, as known without the benefit of the present disclosure. In particular, attempting to use known distributed MAC protocols in multihop wireless networks to achieve low or short packet delay times consequently leads to reducing spectrum usage and data throughput.

One grouping of distributed MAC protocols in wireless networks is random access MAC protocols. Random access MAC protocols control data transmissions in a distributed manner whereby nodes in the network decide in a randomized manner as whether or not to transmit data at a given time. An example of a known group of random access MAC protocols are the Carrier Sense Multiple Access Control (CSMA) protocols which are used in both for wired and wireless communication networks. CSMA protocols and their variants are the part of many standards including IEEE 802.11 and IEEE 802.15 in the wireless domain, and Ethernet (IEEE 802.3) in the wired domain.

However, for many topologies of multihop wireless networks, the known CSMA protocols (as known without the benefit of the present disclosure) may incur a large packet delay. In particular, attempting to use known CSMA protocols to achieve low or short packet delay times in multihop wireless networks consequently leads to a significant reduction in spectrum usage and data throughput.

Known MAC protocols also include Orthogonal Frequency-Division Multiple Access (OFDMA), Time Division Multiple Access (TDMA), and Code Division Multiple Access protocols. However, OFDMA, TDMA, and Code Division Multiple Access and CDMA protocols and their combinations have often been limited to single-hop networks, as in traditional GSM and UMTS 3G systems.

Known MAC protocols also include matching protocols. Distributed versions of matching protocols can require excessive message exchange between neighbouring nodes, or can not achieve a low packet delay without reducing spectrum usage and data throughput. Hence, matching protocols are often not suitable for a practical distributed implementation in multihop wireless networks.

BRIEF DESCRIPTION OF THE DRAWINGS

Embodiments will now be described by way of example only with reference to the appended drawings wherein.

DETAILED DESCRIPTION

Figure 1:
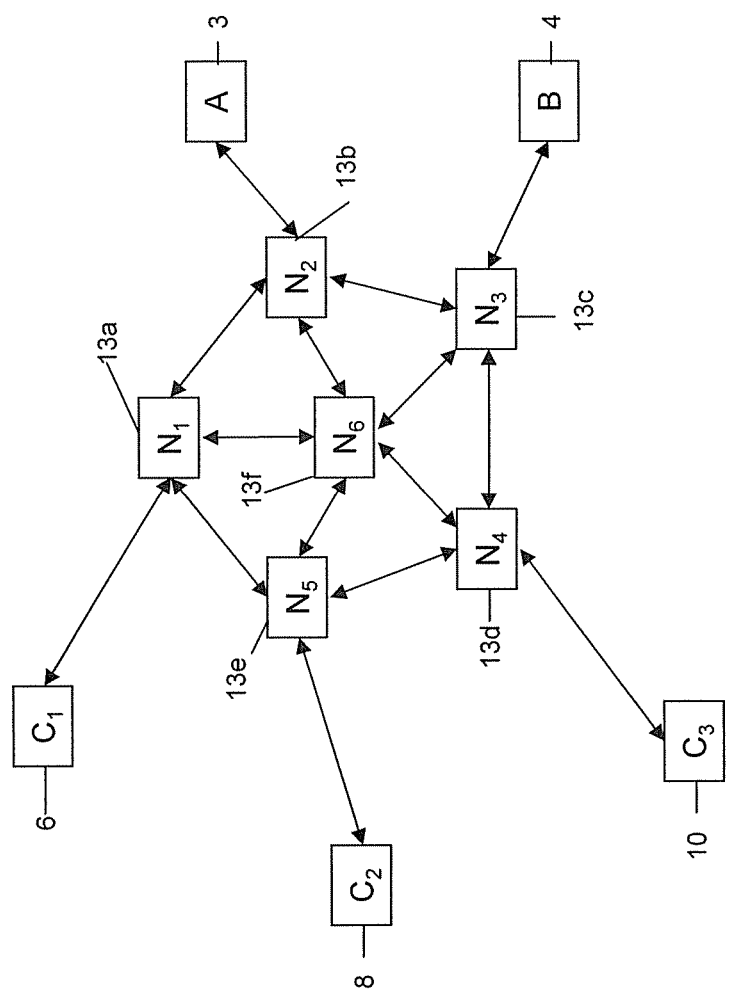
FIG. 1 is an example schematic diagram of wireless nodes in a multihop wireless network in communication with other communication devices.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art and having the benefit of the present disclosure that the embodiments described herein may be practiced without these specific details. In other instances, well-known methods, procedures and components have not been described in detail so as not to obscure the embodiments described herein. Also, the description is not to be considered as limiting the scope of the embodiments described herein.

By way of background, wireless cards can be networked together by using wireless links to form a multihop wireless network. A wireless card is a type of a wireless device. One or more wireless cards can be used with additional hardware to form a wireless node. Therefore, it is also known that a multihop wireless network is formed by wireless nodes. Examples of such wireless nodes include wireless communication devices, wireless routers, wireless access points etc.

In wireless multihop networks, data is generally generated by applications that run on a wireless node. In order to send data to a destination node in the wireless multihop network, data generated by the source node may traverse one or more intermediate wireless nodes along the path to the destination node.

In general, the proposed systems and methods are provided for controlling transmission of data on a wireless device in a wireless network. The method comprises: the wireless device monitoring if a communication channel of the wireless device is in a locked state, the locked state identified by having fewer than a predetermined number of opportunities to initiate a data packet transmission within a predetermined time period; and, upon the wireless device detecting the locked state, the wireless device unlocking the communication channel by stopping transmission of data along the communication channel.

Preferably, although not necessarily, the wireless network is a multihop wireless network. It can be appreciated that the principles described herein for detecting a locked state and unlocking a channel can also be applied to other types of wireless networks.

In another aspect of the proposed systems and methods, the wireless device transmits to one or more other wireless devices in the wireless network an unlocking signal to stop transmission of data along the communication channel.

In another aspect of the proposed systems and methods, the wireless device is a wireless card comprising a wireless radio, and stopping transmission of data along the communication channel comprises stopping transmission of data from the wireless radio.

In another aspect of the proposed systems and methods, the wireless device detects the locked state by monitoring receipt of an unlocking signal. The unlocking signal indicates that the communication channel is in the locked state and prompts the wireless device to stop transmission of data along the communication channel.

In another aspect of the proposed systems and methods, the unlocking signal is generated by an ancillary wireless device or a third party controller in the wireless network, the unlocking signal transmitted to the wireless device.

In another aspect of the proposed systems and methods, upon detecting the locked state, the wireless device checks one or more conditions before unlocking the communication channel.

In another aspect of the proposed systems and methods, the one or more conditions comprise determining if there are one or more data packets queued on the wireless device to be transmitted over the communication channel and, if so, the wireless device unlocking the channel.

In another aspect of the proposed systems and methods, the one or more conditions comprise determining if one or more high priority data packets are queued on the wireless device to be transmitted over the communication channel and, if so, the wireless device unlocking the channel.

In another aspect of the proposed systems and methods, upon the wireless device stopping transmission of data along the communication channel, the wireless device waits for a random period of time before attempting to start data transmission.

In another aspect of the proposed systems and methods, there are multiple wireless devices in the wireless network. In such a situation, the random period of time is in approximate length to a time period beginning from when one of the wireless devices first detects the communication channel is in the locked state and transmits to one or more other wireless devices an unlocking signal to indicate that the channel is in a locked stated and to stop transmission of data along the communication channel, and the time period ending when all the wireless devices in the wireless network detect that the channel is locked.

In another aspect of the proposed systems and methods, the wireless device determines if it is authorized to transmit the unlocking signal and, if so, the wireless device transmits the unlocking signal.

In another aspect of the proposed systems and methods, the principles described herein are used in combination with a Carrier Sense Multiple Access (CSMA) protocol.

In another aspect of the proposed systems and methods, the predetermined time period is used as an input to update at least one of an attempt rate for a media access control protocol and a flow rate for a rate control protocol.

In another aspect of the proposed systems and methods, the predetermined number of opportunities is used as an input to update at least one of an attempt rate for a media access control protocol and a flow rate for a rate control protocol.

Further details regarding the proposed systems and methods for controlling data transmission are provided below.

Turning to FIG. 1, an example of a multihop wireless network is shown comprising a number of wireless nodes 13a, 13b, 13c, 13d, 13e and 13f. It can be appreciated that any wireless node is herein referenced with numeral "13" and to distinguish between wireless nodes, alphabetical suffixes "a", "b", etc. will be used. Connected to, or forming part of the multihop wireless network, are cameras 6, 8, 10 and security stations (e.g. computing devices) 3 and 4. Such a multihop wireless network is suitable for transmitting video data from the cameras 6, 8, 10 across two or more of the wireless nodes 13a, 13b, 13c, 13d, 13e and 13f, thereby allowing the security stations 3 and 4 to receive the video data from any of the cameras 6, 8, 10. For example, security station 3 can receive video data originating from any one of cameras 6, 8, 10. Such a security surveillance system is advantageous for wirelessly transmitting data in buildings, for example, where there are many walls and structures that may reduce the wireless signal strength. However, employing a multihop wireless network allows the video data to be transmitted over shorter distances to maintain signal strength. It can be appreciated that the configuration in FIG. 1 is just an example, and that there are many applications of multihop wireless networks that can benefit from the present disclosure.

Figure 2:
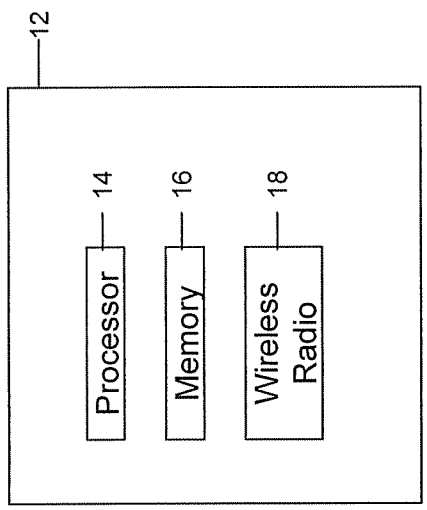
FIG. 2 is an example block diagram showing components of a wireless card.

The wireless nodes 13 are arranged in a star-type configuration as shown in FIG. 2, whereby data from camera 6 can be transmitted along a path to wireless node 13a, wireless node 13b, and then to security station 3. Alternatively, data from camera 6 can be transmitted along another path to wireless node 13a, wireless node 13f, wireless node 13c, and then to security station 4. In another path to security station 4, data from camera 6 is transmitted to wireless node 13a, to wireless node 13b, to wireless node 13c, and then to security station 4. It can be appreciated that data from the cameras 6, 8, 10 can take many different paths through the wireless nodes 13a, 13b, 13c, 13d, 13e and 13f in order for the data to reach security station 3 or security station 4.

Each wireless node is equipped with one or more wireless cards that enable data communication between nodes, e.g. to transmit data from one wireless node to another. A wireless node that has several wireless cards may have the capability to route data between these wireless cards, e.g. to route data packets received on one wireless card to another wireless card within the wireless node.

Wireless cards send and receive data over a wireless channel. The wireless medium can be divided into several wireless channels using space-division multiplexing (SDM), frequency-division multiplexing (FDM), code division multiplexing (CDM), time-division multiplexing (TDM), or space-division multiplexing (SDM). In FDM, a wireless channel is defined by a frequency range, in CDM a channel is defined by a common code, in TDM a channel is defined by a series of time-slots, and in space-division multiplexing a channel is defined by a geographic area.

Turning to FIG. 2 an example configuration of a wireless card 12 is shown, which may comprise a processor 14, memory or memory storage 16, and a wireless radio 18. The memory 16 can store the communication protocols including, for example, the MAC protocol as well queued data packets. The processor 14 can execute the rules of implementing the communication protocols, such as which data to send on which communication channels, and at what times. The wireless radio 18 is used to send and receive data. In order to be able to send or receive data packets on a given wireless channel, the wireless card 12 has to tune its radio to this channel. The wireless radio 18 of a wireless card 12, and hence the wireless card 12, might have the capability to tune to several wireless channels either simultaneously or sequentially.

For each wireless channel, a wireless card 12 has a wireless transmission range. For a given wireless channel, a given wireless card 12 can only exchange (e.g. send and receive) data packets from another wireless card 12 if the given wireless card is within the transmission range of the other wireless card 12 for the given wireless channel. The transmission range of a wireless card 12 can be different for different channels.

Wireless cards 12 can interface directly with each others to form wireless links. As described above, a wireless link is defined by a sender wireless card and a receiver wireless card, and by a wireless channel that is used by the sender wireless card to transmit data to the receiver wireless card.

Consider a give wireless link l that can be used by the sender wireless card c1 to send data to the receiver wireless card c2 on the wireless channel ch1. The wireless link l is considered active if the sender card c1 uses the wireless channel ch1 to send data packets to the receiver wireless card c2.

Figure 3:
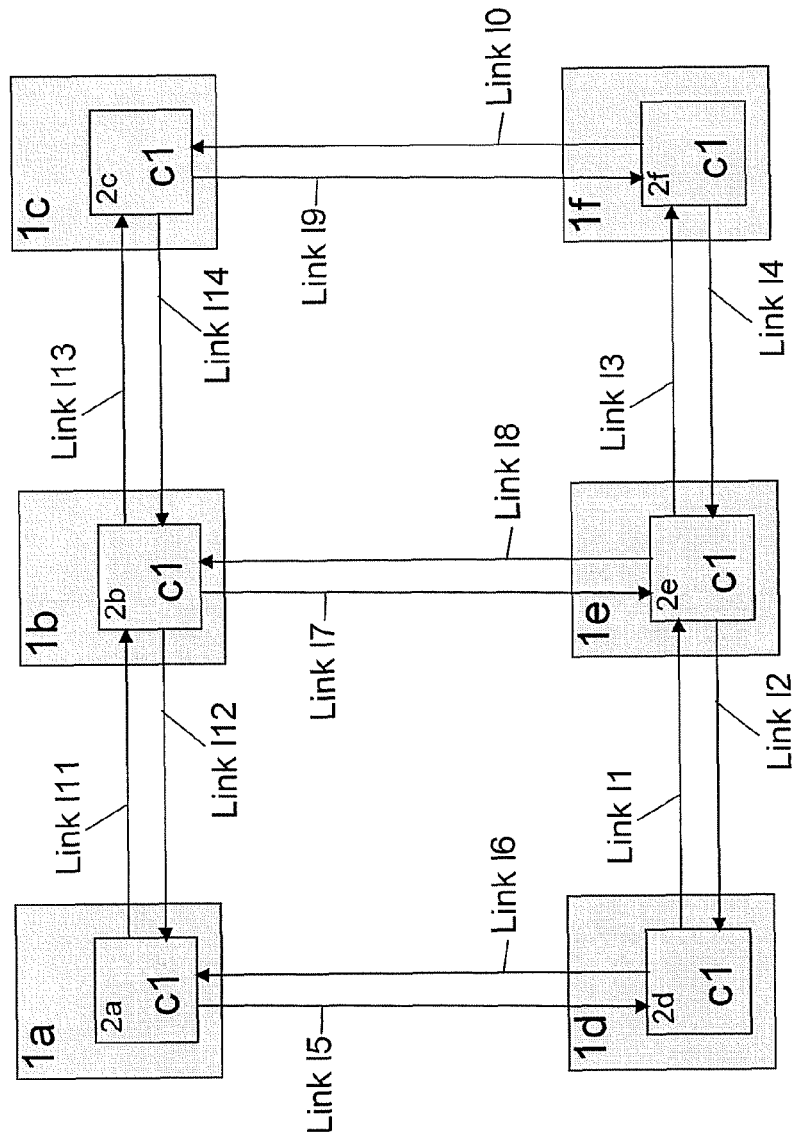
FIG. 3 is an example schematic diagram of wireless nodes, wireless cards, a wireless channel and wireless links in a wireless multihop network.

Turning to FIG. 3, an example configuration of a wireless network is shown, which consists of six wireless nodes 1a, 1b, 1c, 1d, 1e and 1f. Each wireless node has a wireless card. There are a total of six wireless cards c1, c2, c3, c4 and c5. All the wireless cards in the wireless network can only tune to a single wireless channel ch1. In other words, all the wireless cards communicate on the same channel ch1. The wireless cards can form a total of fourteen wireless links l1, l2, l3, l4, l5, l6, l7 l8, l9, l10, l11, l12, l13 and l14, which connect the wireless cards. The wireless links are formed on the wireless channel ch1.

In addition to a transmission range, there is also an interference range of a wireless card 12 on a given wireless channel w_c. If a wireless card 12 transmits data on a particular channel, then this data transmission will interfere with all wireless cards 12 within the interference range of the wireless card 12 on this channel.

If two wireless links 11 and 12 both use the channel ch1, then the two wireless links 11 and 12 interfere with each other if either the sender or receiver wireless card of link 12 is in the interference range of either the sender or receiver wireless card of link 11 on channel ch1, and vice versa.

If two wireless links 11 and 12 interfere with each other and both are active at the same time, then the data transmissions on the two links will cause interference and potentially corrupt the data transmission on one or both wireless links. The goal of the MAC protocol in wireless multihop wireless networks is to control data transmission in such a way that no two links that interfere with each other are active at the same time.

A common concept used in wireless networks to define which links interfere with each other is the concept of an interference graph, an explanation of which is provided here. The nodes of the interference graph represent the wireless links in the wireless network. If two wireless links in the wireless network interfere with each other, then the two vertices are connected in the interference graph to represent the two interfering wireless links with an edge.

Figure 4:
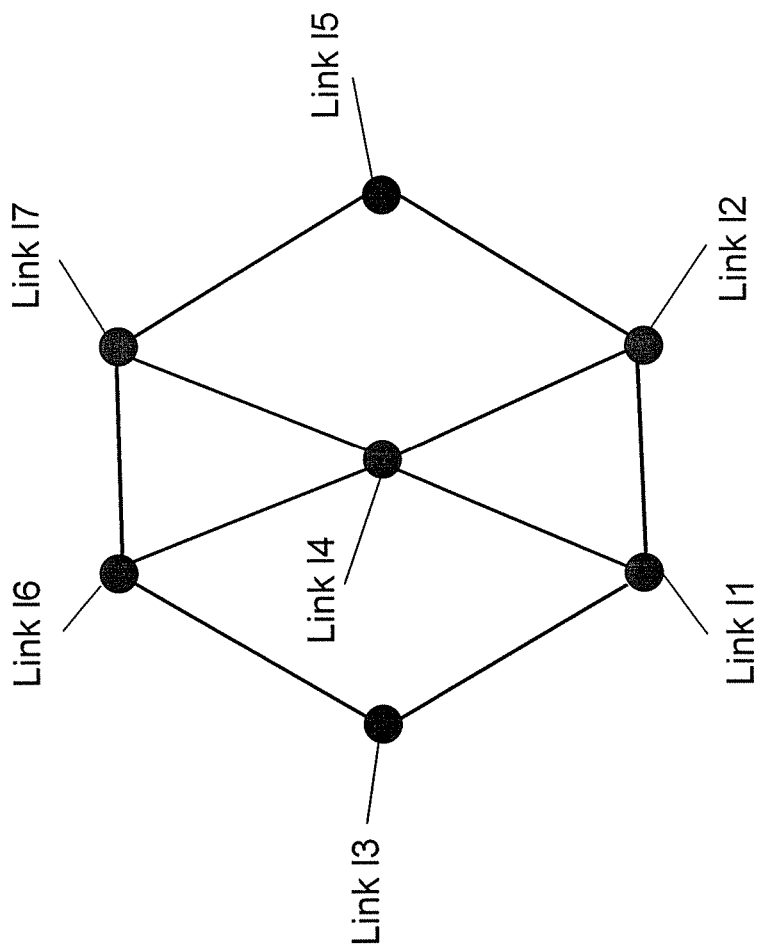
FIG. 4 is an example schematic illustrating an interference graph of a wireless network.

Turning to FIG. 4, an example for an interference graph of a wireless network is shown. The seven vertices in the interference graph represent seven wireless links 11, 12, 13, 14, 15, 16 and 17, that exist in the wireless network. An edge between two wireless links indicates that the two links interfere with each other. For example, the interference graph of FIG. 3 states link 11 interferes with link 12, however link 11 does not interfere with link 16. Therefore, the two wireless links 11 and 16 could be active at the same time without causing interference. However, whenever links 11 and 12 are active at the same, their data transmissions will interfere with each other.

Using the concept of an interference graph, the goal of the MAC protocol in a multihop wireless network is to control data transmissions on the different wireless links in such a way that no two links that are connected by an edge in the interference graph are active at the same time. If two links that are connected by an edge in the interference graph are active at the same time, then the data packets transmission on the two links will interference and potentially corrupt the data transmission on one or both wireless links.

In CSMA-type MAC protocols, herein also referred to as CSMA protocols for brevity, data transmissions by a wireless card are controlled as follows. Before sending a data over a wireless link 1 that uses channel w_c, the sender card of link 1 invokes a so-called carrier-sensing mechanism. As part of the carrier-sensing mechanism, the sender card senses or monitors the wireless channel w_c to determine whether another link that interferes with the wireless link 1 is currently active. If the sender card determines that no other link that interferes with I is currently active, then the sender card may initiate a data transmission over the wireless link 1. If during the carrier-sensing mechanism the sender card detects that another link which interferes with I is currently active, then the sender card will not initiate a data transmission.

CSMA protocols typically limit the amount of data that a sender is allowed to transmit once it is allowed to start a data transmission. This limit is typically given in the form of the maximum length or size of a data packet that can be transmitted as part of the data transmission. Limiting the length or size of a data packet that can be sent does limit the total time for which a wireless link needs to be active to successfully transmit a packet from the sender to the receiver. Once a data packet has been transmitted, the sender has to initiate another carrier-sensing mechanism before it is allowed to send another data packet.

When a sender card of link 1 initiates a transmission of a data packet, then link 1 will be active for the duration of the packet transmission as well as the duration of additional control packets that the sender and receiver of link 1 exchange in order to successfully complete the data communication.

CSMA protocols may differ between one another in the carrier-sensing mechanism. Generally, a sender wireless card uses a carrier-sensing mechanism to determine whether a given wireless channel is idle before starting a packet transmission over a wireless link 1 that uses the given wireless channel. This sensing or determination of whether the given wireless channel is idle is used to determine whether another link that interferes with the wireless link 1 is currently active. Particularly, if it is sensed or determined that the given channel is not idle, it may be considered that another link (that interferes with the wireless link 1) is currently active.

One common realization of the carrier sensing mechanism for CSMA protocols is that the sender wireless card has to determine that the channel is idle for the duration of certain of time, which is herein referred to as the sensing period. Typically, the sensing period is given by a pre-defined and fixed parameter $\beta$ of time units. After having sensed a channel to be idle during a sensing period of duration $\beta$, a sender wireless card is allowed to initiate a data transmission in a randomized manner as follows. When a sender wireless card has sensed the wireless channel is idle for the whole duration of the sensing period, then it initiates a data packet transmission having a probability that is a function of the sensing period $\beta$ as well as another parameter $z_l$ associated with the wireless link 1. The value is $z_l$ herein referred to as the transmission attempt rate, or attempt, of link 1. The attempt rate $z_l$ at link could be a fixed value, or could be dynamically updated over time according to some function. The function that is used to dynamically update $z_l$ may depend on, but is not limited to, variables such as the number of data packets to be transmitted over link 1 that are queued at the sender wireless card and the delay requirements of the data packets queued at the wireless card. When at time t the sender wireless card has sensed the wireless channel to be idle for the whole duration, then it is allowed to initiate a packet transmission probability ($\beta z_l(t)$), where $\beta$ is the length of the sensing period and $z_l(t)$ is the value of the attempt rate of link 1 at time t. If the sender card is not allowed to start a data transmission on the wireless link 1, then it will initiate another carrier-sensing mechanism. Note that the higher the value of the attempt rate $z_l$ of link 1, the more likely, or the higher probability, it is that the sender card is allowed to initiate a data transmission after a sender card has sensed the wireless channel to be idle for the duration of the sensing period of $\beta$ time units.

Another common realization of a CSMA is to define a sensing period as described above, and to require a sender card for a wireless link 1 to sense the channel that the wireless link 1 uses to be idle during for several sensing periods of length $\beta$. This approach is used for example in the IEEE 802.11 standards. Under this approach, the number of sensing periods for which the channel has to be idle is given by a contention window which is a value that is dynamically updated over time. The function that is used to update the contention window may depend on, but is not limited to, variables such as the number of data packets destined for link 1 that are queued at the wireless card, the delay requirements of the data packets queued at the wireless card, the number of corrupted data transmissions due to interference occurred on link 1, etc. Under this approach, the attempt rate $z_l$ for the wireless link l may alternatively be defined in relation to the length of the contention window. The value of the contention window $cw_l(t)$ for link l is updated at time t, then the value of the contention window is determined in a randomized manner, for example by choosing $cw_l(t)$ according to a random variable that has a geometric distribution with mean $(1/(\beta z_l(t))$.

Known CSMA protocols are able to achieve a high-throughput in multihop wireless networks. However, for many interference graph topologies, the known CSMA protocols (as known without the benefit of the present disclosure) may incur a large packet delay in order to achieve a high throughput. Similarly, for many topologies of the interference graph, attempting to use known CSMA protocols to achieve low or short packet delay times consequently leads to a significant reduction in spectrum usage and data throughput. As are result, for many multihop wireless networks known CSMA protocols cannot achieve a low packet delay without significantly reducing spectrum usage and throughput.

Typically, the known CSMA protocols, over some length of time, begin to settle into a transmission pattern whereby some wireless links are active almost all the time and prevent other wireless links from becoming active over an extended period of time. Such a situation is interchangeably herein referred to as locking, a locked state, or a locked transmission pattern. The links that are active most of the time under a locked transmission pattern are able to achieve a high throughput and low packet delay. However, the links that are prevented from becoming active over an extended period of time under a locked transmission pattern will achieve only a very small throughput, or no throughput at all. In particular, in a locked transmission patter, a link is prevented from becoming active for an extended period of time, thereby requiring data packets to be queued at the wireless card 12 as the data packets await their transmission over the link. Thus, the queued data packets experience a high delay.

In order to prevent a wireless network from locking into a transmission pattern for an extended period of time, an unlocking period T is used to periodically unlock a transmission pattern by requesting all active links of the transmission pattern to become idle. In other words, the unlocking period T is used to limit the length of time that a wireless network can lock into a particular transmission pattern, e.g. for at most T time units. Further details in this regards are described below.

More formally, the terms "locking", "a locked state", "a locked transmission pattern", or the like are collectively defined herein as the situation when there exists a wireless link l that has fewer than $K_l$ opportunities to initiate a data packet transmission over given period of $T_l$ time units. $T_l$ is the unlocking period for link l. $K_l$ is the number of opportunities to initiate a data packet transmission. A wireless link l has an opportunity to transmit data if the sender card of the wireless link l successfully determines that the wireless channel is not used by any wireless link with which link l interferes. Within the context of a CSMA protocol, this determination is made by the carrier sensing mechanism. The length of the unlocking period depends on the delay requirements of the data that is being transmitted over link l. For data that is not delay sensitive, the locking period $T_l$ might be chosen to be a few seconds, or even longer. For data that is very delay sensitive, the unlocking period might be chosen to be equal to a few milliseconds or even shorter. The value $K_l$ depends on the length of the unlocking period $T_l$ and the time it takes to transmit a data packet. In particular, the longer $T_l$, the larger $K_l$ will be, and the shorter the time it takes to transmit a data packet the larger.

When there exists a wireless link l that has fewer than a threshold of $K_l$ opportunities to initiate a data packet transmission over given period of $T_l$ time units, then it may be specified that the wireless network has reached a locked state or a locked transmission pattern. It may also be specified that the wireless channel that is used by link l has been locked, or has reached a locked state.

Unlocking of a locked channel is defined herein as the process that causes the active links, which caused locking of the channel, to become inactive and hence allow other wireless links that have been locked out to become active.

Therefore, in general, the locked state is identified by having fewer than a predetermined number of opportunities $K_l$ to initiate a data packet transmission within a predetermined time period $T_l$. Upon the wireless device detecting the locked state, the wireless device unlocks the channel by stopping transmission of data along the communication channel.

By way of background, in the example wireless network given in FIG. 3 with an interference graph as given by FIG. 4, if the wireless links 13, 14 and 15 are active all the time then they will prevent the links 11, 12, 16 and 17 from becoming active. Therefore, a transmission pattern where, for an extended period of time, links 13, 14 and 15 are active most of the time will lockout links 11, 12, 16 and 17 from becoming active. Under such a transmission pattern, the links 11, 12, 16 and 17 would be locked out from transmitting data. Under such a transmission pattern, the situation can arise where the wireless links 13, 14, and 15 are able to achieve a high throughput and low packet delay, whereas links 11, 12, 15 and 16 will have a very low throughput and a high packet delay. It can therefore be appreciated that the locked state of a multihop wireless network can overtime become very inefficient at transmitting data from various sources to various destinations, as originally intended.

Figure 5:
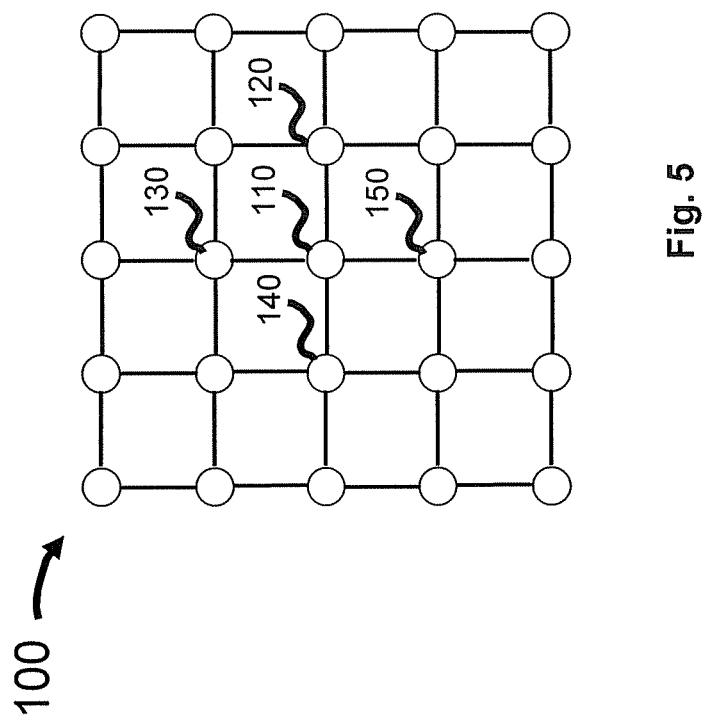
FIG. 5 is an example schematic diagram illustrating an interference graph with a grid topology.

Also by way of background, to further clarify the drawbacks associated with known CSMA protocols, as known without the benefit of the present disclosure, an example interference graph with a grid topology 100 is shown in FIG. 5. This grid topology 100 illustrates an interference graph where each vertex represents a wireless link, and an edge between two vertices indicates that the two corresponding wireless links interfere with each other. For example, in the interference graph given by the grid topology 100, the wireless link 110 interferes with the wireless links 120, 130, 140, and 150. Therefore, the transmission of data using link 110 can be interfered by the transmission of data through any one of links 120, 130, 140 and 150. In other words, if any one of links 120, 130, 140, and 150 is being used to transmit data, then link 110 cannot be used to transmit data. Let L be the number of links in the grid topology 100. It is appreciate that while the interference graph in FIG. 5 consists of 25 vertices representing 25 wireless links, an interference graph with such a grid topology can be created for any number of links L for a size L equal to $n^2$ for some positive integer value n. As an exemplary embodiment, let the transmission rate on all links be equal to $u_l$ in Mbits/sec. Furthermore, let the data arrival rate to all links be equal to λ in Mbits/sec. The value λ is that amount of data per second that arrives on the sender wireless card for link l and is destined to be transmitted over the wireless link l. While λ is the amount of data that arrives per second to be transmitted over the wireless link, the actual amount of data that is being transmitted over the wireless link l depends on the MAC protocol that is used to control the packet transmissions in the wireless network. For a given MAC protocol, long term transfer rate in Mbits/sec of data that is being transmitted over the wireless link l under this MAC protocol is called data throughput of the link l under this MAC protocol.

Figure 6:
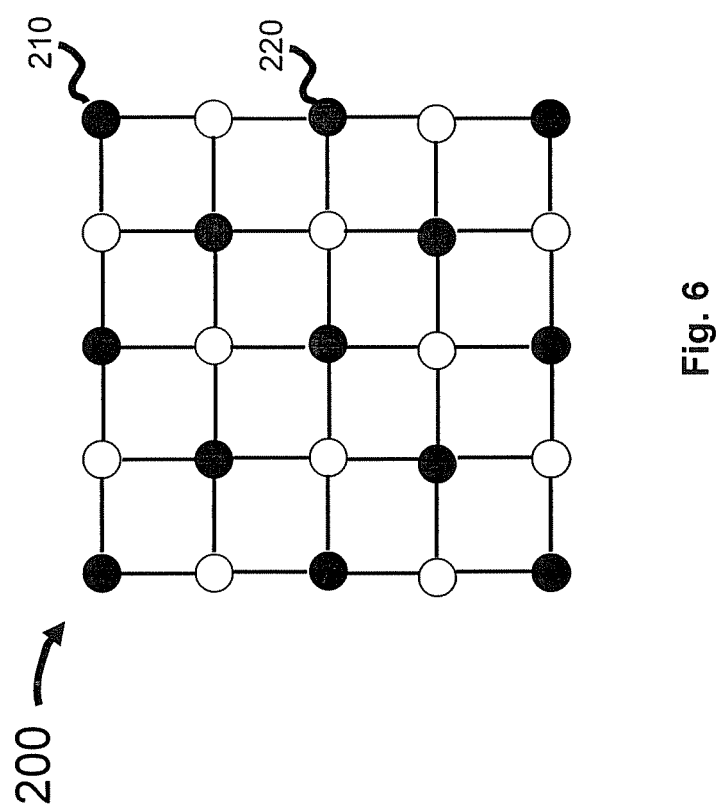
FIG. 6 is an example schematic diagram of the grid interference topology, as per FIG. 5, but where links that do not interfere with each other are coloured with the same color.

Consider, for example, the situation where the objective is to maximize the uniform data throughput in a wireless multihop network. In other words, it is desired that all links have the same data throughput and this achieved data throughput is maximized. For an example network 100 shown in FIG. 5, the uniform data throughput is maximized by the following centralized MAC protocol. Notably, centralized MAC protocols often have more information about the network available, and therefore are typically able to provide a better performance compare with distributed protocols. In this case, considering a centralized MAC protocol is used as an example to determine the optimal uniform data throughput that any MAC protocol can achieve. The centralized MAC protocol that is considered is given as follows. Time is divided into time-slots of equal length. Referring to FIG. 6, at every even time-slot, all wireless links represented by a filled solid in black circle, such as link 210, hereafter referred to as "black links", are transmitting data with transmission rate $\mu_r$ in Mbits/sec. And, at every odd time-slot, all wireless links represented by unfilled dots, such as link 220, hereafter referred to as "white links", are transmitting data with transmission rate $\mu_r$ in Mbits/sec. By the configuration of the example network 100 of FIG. 5, no black link interferes with another black and no white link interferes with another white link. Hence, under this MAC protocol all data transmissions are successful as they do not experience any interference. Furthermore, as the MAC protocol alternates between two transmission patterns where either all by black or all white links are active, and all time slots are of equal length, the data throughput of each wireless link under this MAC protocol is equal to $0.5\mu_r$ Mbits/sec, which is equal to the maximum uniform data throughput that can be achieved using any MAC protocol for an interference graph with the type of grid topology as given in FIG. 5.

Consider now the CSMA protocol where the sensing period for each link is randomized, and generate according to a random variable with an exponential distribution with mean $1/z$, where refer to z as the attempt rate. When a sender card of a wireless link has determined that no link that interferes with link l has been active during the duration of a sensing period, then it initiates a transmission of a data packet. Note that the higher the attempt rate z is chosen, the shorter is the mean sensing period given by $1/z$. Therefore, in order to achieve a high throughput it is desirable to choose a high attempt rate z as this reduces the amount of time a sender card has to wait in order to start a transmission of a data packet.

In the exemplary network 100 of FIG. 5, under the described CSMA protocol a large attempt rate z needs to be chosen in order to obtain a high throughput. Note that the higher the attempt rate z is chosen, the shorter is the mean sensing period given by $1/z$. Therefore, in order to achieve a high throughput it is desirable to chose a high attempt rate z as this reduces the amount of time a sender card has to wait in order to start a transmission of a data packet. However, choosing a high attempt rate gives rise to a major problem with respect to the packet delay. If the attempt rate z is chosen to be large, then after some length of time the described CSMA protocol will cause a locked transmission pattern where either mostly black links, or mostly white links are active. Once locked into one of these two transmission patterns, the wireless network will stay in this pattern for an extended period of time. Suppose that the wireless networks locks into a transmission pattern for an extended period where mostly blacks links are active and most white links are inactive. In this situation, most black links will experience a high data throughput and a low delay; however most white links will obtain only a small throughput and experience a large packet delay. The reason why the described CSMA protocol causes a locked state is as follows. Suppose that attempt rate z is very high so that the sensing period in the carrier sensing mechanism is very small. Furthermore, suppose that all black links are active. Then for a white link l to have an opportunity to become active, all four of the black links that interfere with the white link l have to finish their packet transmissions almost at the same time. If data packets are of different sizes, then the event that the four black links that interfere with the white link l stop their packet transmissions almost at the same time is very unlikely to occur, and as a result the white link will have only very infrequently a chance to become active. Consequently, the described CSMA protocol may undesirably cause locked transmission pattern where mostly black links are active for an extended period of time.

For the described grid topology of the interference graph, if the attempt rate z is high, then under the described CSMA protocol the time for which the wireless network locks into a transmission pattern where either mostly black or white links are active can grow exponentially with the number of wireless links in the network. Moreover, CSMA protocols, as known without the benefit of the present disclosure, can lead to a packet delay that grows exponentially with the number of links in the network 100. As a high attempt rate is necessary in order to achieve a high data throughput, this means that known CSMA policies cannot provide a low packet delay without significantly reducing the data throughput. It can therefore be appreciated that CSMA protocols have competing objectives: achieving high data throughput and achieving low packet delay.

While the above example was given for a specific implementation of a CSMA protocol, as known without the benefit of the present invention, such observed behaviour that the wireless networks reaches a locked state is generic to known CSMA protocols.

To characterize the packet delay under the known CSMA protocol for the exemplary interference graph 100 of FIG. 5, the following notation is used. Let $\lambda$ be the data arrival rate to any wireless link, and let $\lambda_{max}$ be the maximal uniform data throughput that can be achieved by any MAC protocol for the exemplary interference graph 100 of FIG. 5. Recall that $\lambda_{max}$ is equal to $0.5\mu_t$ Mbits/sec, where $\mu_r$ is the transmission rate of a link in Mbits/sec. Then the network load $\rho$ is the ratio of arrival rate $\lambda$ over the maximal uniform throughput $\lambda_{max}$ given by $$\rho = \frac{\lambda}{\lambda_{max}}.$$

Note that the data arrival rate $\lambda$ should not exceed the maximal uniform data throughput $\lambda_{max}$ as in this case the network would become unstable as the arrival rate exceeds the throughput. Therefore the maximal allowed network load is equal to 1. The value $\epsilon$ is the difference between the maximal allowed network load and the actual network load $\rho$, given by $\epsilon = 1 - \rho$. Note that a small value of $\epsilon$ indicates that a high throughput is obtained, whereas a value of $\epsilon$ close to 1 indicates that only a small throughput is obtained.

Using the above definition, for small values of $\epsilon$, the packet delay for the exemplary network 100 of FIG. 5 is lower-bounded by $e^{L/(\log L)^2}$. Recall that a small value of $\epsilon$ is desirable as this indicates a high data throughput. However for small values, the average packet delay grow as $e^{L/(\log L)^2}$ in the number of wireless links in the interference graph. Therefore, in order to achieve a high throughput, under the known CSMA protocols a prohibitively large packet delay must be tolerated.

In view of the above discussion, it can be appreciated that wireless networks, such as multihop wireless networks, can reach a locked stated which negatively effects the delay experienced by data packets. The challenge in the design for distributed MAC protocols for multihop wireless network is therefore to find a MAC protocol that is able to achieve a high throughput without locking into certain transmission patterns for long period of times.

Therefore, the proposed systems and methods recognize such drawbacks and provides a modified MAC protocol that includes an unlocking mechanism. The unlocking mechanism prevents or reduces the occurrences or duration, or both, of the locking behaviour, and therefore reduces the packet delay.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both, except transitory propagating signals per se. Any such computer storage media may be part of a wireless card 12, or wireless node, or accessible or connectable thereto. Any application or module herein described may be implemented using computer readable/executable instructions that may be stored or otherwise held by such computer readable media. The computer readable media can also be distributed over computer systems in a multihop wireless network so that the computer readable/executable instructions are stored and executed in a distributed manner.

In general, the unlocking mechanism of the proposed systems and methods described herein detects that a locked state has occurred in a wireless channel and unlocks the wireless channel by stopping data transmission across active links that use this wireless channel. In general, all links that use the wireless channel become inactive and the sender wireless cards wait for a short time period before starting the CSMA carrier-sensing mechanism to check if a wireless channel is being interfered with another link. The short time period that a wireless card waits before starting the CSMA carrier-sensing mechanism could be randomized. Such randomization is useful to help generate, after using the unlocking mechanism, a new transmission pattern that is different from the transmission pattern that caused the locked channels. In other words, a new transmission pattern that may be more randomized will more likely emerge when using a randomized waiting period. This can be carried out before attempting to start a packet transmission. Once all links in the wireless channel are inactive, the wireless links that have been locked out by the previous transmission pattern have now a chance to become active. Unlocking wireless channel in this way will allow all wireless links that use this channel to have an increased chance to transmit a data packet, hence improving the delay performance of the wireless network. Furthermore, by detecting a locked state in an appropriate manner as described below, a low packet delay can be obtained without significantly reducing spectrum usage and data throughput.

It is noted that an unlocking mechanism is generally specified for, and applied to, a wireless channel, as only links that use the same wireless channel potentially interfere with each other.

To stop the transmission on an active link, the wireless card can signal its wireless radio to stop transmitting additional bits of the data packet currently being transmitted, and to become idle. The wireless card has a copy of the entire data packet that is currently being transmitted so that the data packet is not lost when its transmission is being interrupted by the unlocking mechanism. If the transmission of the data packet gets stopped by the unlocking mechanism before it has been completed, the wireless card will resend the packet at a later time using the local copy of the data packet.

The unlocking mechanism only affects the packet transmissions that are in progress on active links on the wireless channel to which the unlocking mechanism is being applied. The unlocking mechanism does not affect any other data or data packets held on wireless cards such as for example data packets that are held in the queues at wireless cards.

Figure 7:
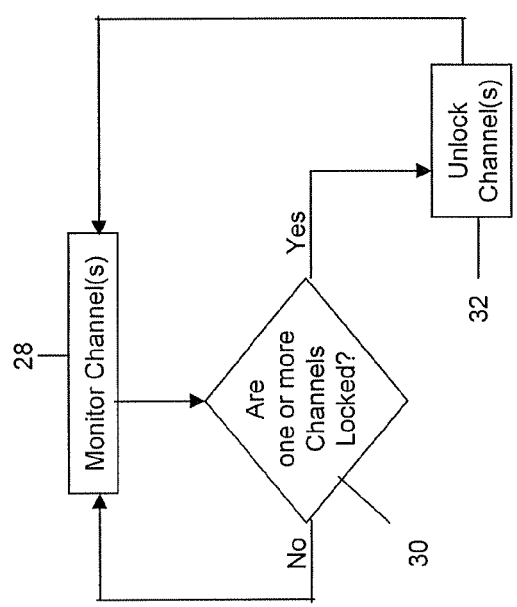
FIG. 7 is a flow diagram illustrating example computer executable instructions for detecting a channel in a locked state and unlocking the channel.

Turning to FIG. 7, example computer executable instructions are provided for unlocking a channel. At block 28, a channel is monitored, either by a wireless card 12 or a third party controller device, to determine if the channel is locked, e.g. if one or more links using this channel have been locked out and only had very infrequently a chance to transmit a packet. In other words, at block 30, it is determined if the channel is locked. If so, at block 32, the channel is unlocked using an unlocking mechanism as specified below and illustrated in FIG. 11. If the channel is not locked, the channel continues to be monitored. It can be appreciated that the above operations can be implemented by a wireless card 12 or a third party controller device in communication with one or more wireless cards 12 in a multihop wireless network.

Figure 8:
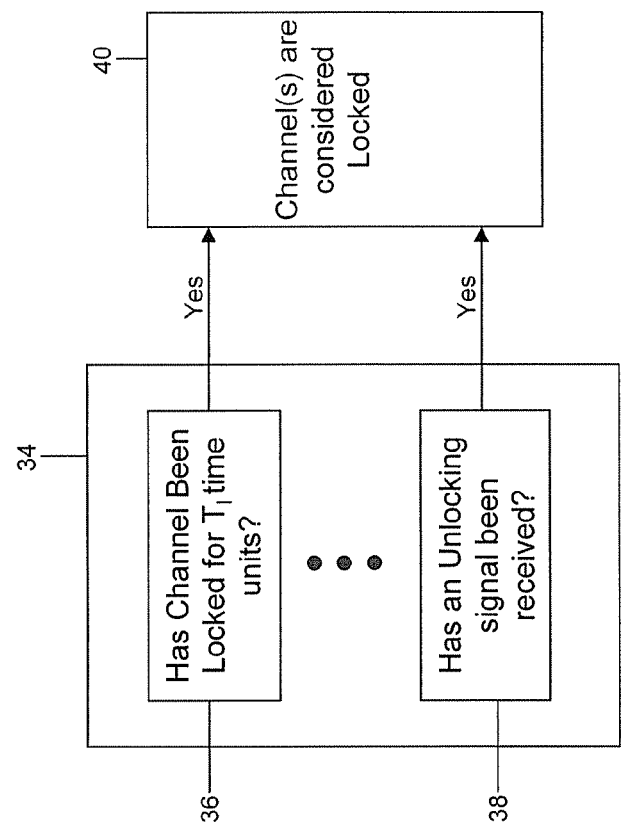
FIG. 8 is a flow diagram illustrating example computer executable instructions for determining whether a channel is considered to be in a locked state.

FIG. 8 describes some of the conditions 34 for determining whether a channel is in a locked state. One condition 36 determines whether a link l that is using the channel had fewer than $K_l$ opportunities to transmit a data packet during an unlocking period of $T_l$ time units. If so, then at block 40, it is established that the channel or channels are in a locked state. Another condition 38 determines if an unlocking signal has been received. If so, then at block 40, the channel associated with the unlocking signal is considered to be in a locked state. The unlocking signal is a signal indicating that a channel is in a locked state.

As will be explained further, a wireless card 12 or a third party controller device may be in communication with other wireless cards 12 or other third party controller devices. Upon detecting a channel is locked, an unlocking signal may be generated by a wireless card 12 or third party controller and transmitted or propagated to other wireless cards 12 or third party controller devices. This indicates that at least one channel in the multihop wireless network is locked and, therefore, the locked channel should be unlocked. Upon receiving an unlocking signal, a wireless card 12 or a third party controller device considers that the channel is locked, and thus, should be unlocked. It can thus be appreciated that the unlocking mechanism is activated by a wireless card 12 or a third party controller device that has directly sensed a locked channel, or is activated by a wireless card 12 or a third party controller device that has received an unlocking signal from another wireless card 12 or another third party controller.

Figure 9:
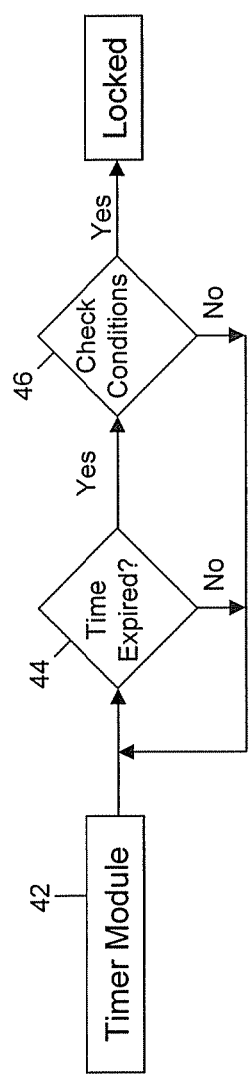
FIG. 9 is a flow diagram illustrating example computer executable instructions for determining whether a channel is locked based on the time period that channel is dominated by a given link.

Turning to FIG. 9, example computer executable instructions are provided for determining whether a channel is locked or not based on measuring if some links have been locked out over a certain period of time. Time module 42 may be part of a wireless card 12 or a third party controller in communication with a wireless card 12. The timer module 42 indicates whether the unlocking period of $T_l$ time units has expired for link l. At block 44, it is then determined if the number of times that link l had an opportunity to initiate a data transmission is below a given threshold value $K_l$ within an unlocking period $T_l$. If not, then the timer module 42 is instructed to indicate when the next unlocking period for this link has been expired. If the number of times that link l had an opportunity to initiate a data transmission is below a given threshold value $K_l$, then at block 46, one or more additional conditions may be checked. If the conditions are satisfied, then the channel is considered locked. If the conditions are not met, then the time measurements are continued to be monitored.

An example condition is whether there are any data packets in the queue for the locked out link. If so, the condition is satisfied. In other words, the locked state for a channel is only established if there is at least one locked out link using that channel that has data packets waiting to be sent. Therefore, there is a need to unlock the locked channel, so that the queued data packets for this link can be transmitted.

Another example condition is the priority of the data packets in the queue for the locked out link. A high priority data packet is a data packet that is sensitive to delay, e.g. a data packet that should not be delayed too much in the wireless network. If the priority of the data packets is high enough, the condition is satisfied. In other words, the locked state for a channel is only established if there is at least one locked out link using that channel that has delay-sensitive data packets waiting to be sent. Therefore, there is a need to unlock the locked channel, so that the queued data packets for this link can be transmitted.

Figure 10:
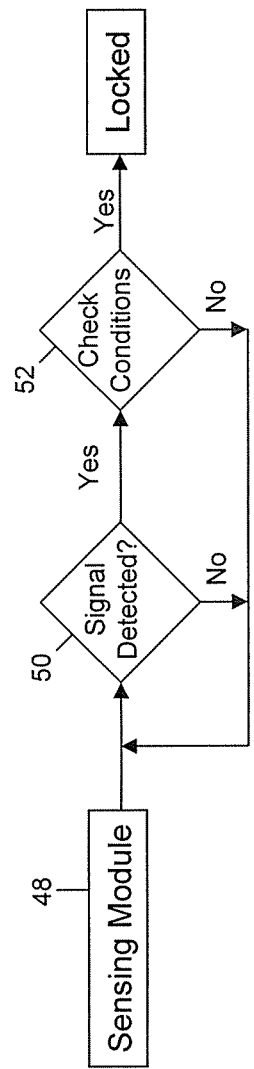
FIG. 10 is a flow diagram illustrating example computer executable instructions for determining whether a channel is locked based on receiving an unlocking signal.

FIG. 10 provides example computer executable instructions for determining whether a channel is locked or not based on receiving an unlocking signal. As discussed above, the unlocking signal may be transmitted or propagated from another wireless card 12 or a third party controller device that has either directly determined that a channel is being locked according to time measurements, or according to receiving an unlocking signal. Further details as to how the unlocking signal is generated is described below. Regarding FIG. 10, a sensing or receiving module 48 receives an indication (e.g. an unlocking signal) whether a channel in the multihop wireless network is being locked. The sensing module 48 may receive the unlocking signal from a wireless card 12 or a third party controller. The sensing module 48 may be part of a wireless card 12 or a third party controller. At block 50, if such an unlocking signal is detected, then, at block 52, further conditions are checked. If the further conditions are satisfied, then it is established that one or more of the channels—associated with the wireless card 12 or the third party controller that sensed or received the unlocking signal—are locked. If the conditions of block 52 are not satisfied, or no unlocking signal is detected at block 50, then the wireless device 12 or third party controller continues to monitor whether the sensing module 48 has received an unlocking signal.

An example condition is whether an earlier unlocking signal has been received within some predetermined time interval. It can be appreciated that in certain configurations, the sensing module 48 can receive multiple unlocking signals from various devices or wireless cards 12. It is also recognized, that upon determining that a channel is locked, and that an originating wireless card 12 or an originating third party controller device sends out an original unlocking signal, the unlocking signal may bounce back or echo back from another wireless card 12 back towards the originating wireless card 12 or originating third party controller. As explained in the following, the originating wireless card 12 or originating third party controller may ignore the echoes by ignoring any received unlocking signals within a certain time period beginning from when the original unlocking signal was sent or propagated.

Other example conditions of block 52 may be similar with the conditions described at block 46 of FIG. 9.

In view of the above, it can be seen that the locked state of one or more channels can be determined in several ways.

When a third party controller detects or has established that a channel associated with itself is locked, it invokes an unlocking mechanism by sending an unlocking signal that is propagated or transmitted to one or more other wireless cards 12 or third party controller devices.

Figure 11:
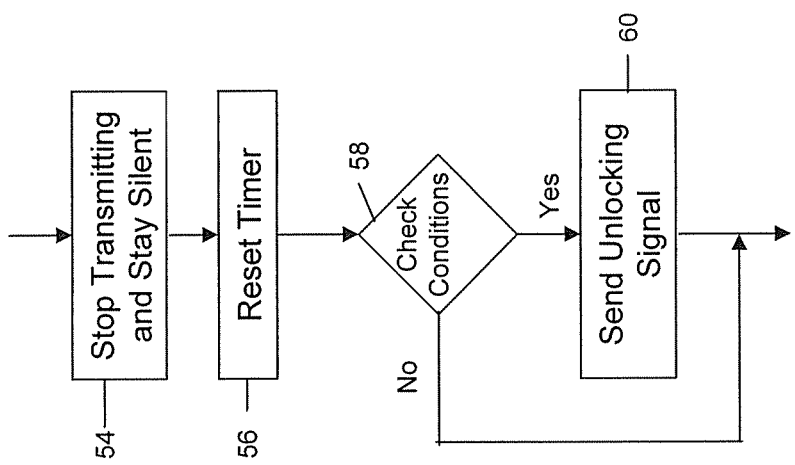
FIG. 11 is a flow diagram illustrating example computer executable instructions for unlocking a channel and propagating an unlocking signal.

When a wireless card 12 senses or detects that a wireless channel is locked, or receives an unlocking signal that the wireless channel is locked, then it invokes an unlocking mechanism and several actions may be performed according to FIG. 11. At block 54, the wireless card 12 signals its wireless radio to stop transmitting data packets on this channel. In addition, the wireless card will wait for a short time period before invoking the CSMA carrier-sensing mechanism to determine whether or not another link that interfaces with the wireless card's own link is active on the channel. The time period that a wireless card waits before invoking the carrier-sensing mechanism could be randomized. This is performed before attempting to start a packet transmission. Performing the operations of block 54 ensures that active links, that may have caused the channel to be locked, become idle and that the channel becomes unlocked. Waiting for a short and randomized time period before invoking a CSMA carrier sensing mechanism can help to achieve a randomized choice of wireless links that can become active after the channel has been unlocked. The length of this short and randomized time period is, for example, determined using the time it takes beginning from the time the locking signal that initiated an unlocking mechanism has been sent out, until the wireless cards (e.g. all sender wireless cards) are informed that the channel is locked. In other words, the length of the short and randomized time that a wireless cards waits after detecting that a channel has been unlocked, until it invokes a carrier sensing mechanism for this channel, should be of the same order as the time that it takes beginning from the time the locking signal that initiated an unlocking mechanism has been sent out until all wireless cards (e.g. sender wireless cards) are informed that the channel is locked. It is appreciated that the sender wireless cards refer to those cards that are able to obtain the unlocking signal using for the channel.

In general, in the typical case where there are multiple wireless devices in the multihop wireless network, the randomized period of time for waiting is in approximate length to a time period beginning from when one of the wireless devices first detects the communication channel is in the locked state and transmits to one or more other wireless devices an unlocking signal to indicate that the channel is in a locked stated and to stop transmission of data along the communication channel, and the time period ending when all the wireless devices in the multihop wireless network detect that the channel is locked.

At block 56, the timer on the timer module is reset and the unlocking period $T_l$ for link is determined as explained below.

The unlocking period $T_l$ is used to determine whether the channel that link l uses is locked as illustrated by FIG. 9.

At block 58, further conditions are checked. If the conditions are satisfied, then an unlocking signal is propagated or transmitted to one or more other wireless cards 12 or third party controller devices (block 60). If the conditions are not satisfied, then an unlocking signal is not propagated.

As per block 58, an example condition is whether the wireless card is authorized to send out an unlocking signal. Note that sending out an unlocking signal can cause other wireless links to abort an ongoing data transmission. As this can be a significant interruption, it can appreciated that only cards that have been authorized to send out a unlocking signal are able to do so.

In view of the above, it can be appreciated that wireless card 12 or a third party controller device can include a timer module 42, a sensing module 48, as well as memory containing the computer executable instructions for detecting a locked state, unlocking a channel, and propagating an unlocking signal. It can also be appreciated that the principles described herein can be applied to a distributed wireless network containing several autonomous nodes that communicate with one another without a single dominant node (for example, an ad-hoc network), or can be applied to a centralized system where there is a single dominant node that overlooks the wireless network. It can be appreciated that, for example, the single dominant node can be a third party controller device.

According to another aspect of the proposed systems and methods, the unlocking mechanism dynamically updates the unlocking period $T_l$ for the wireless link over time. For example, the unlocking period $T_l$ may be updated as a function of the priority of the data packets that are in the queue for link l. High priority data packets are sensitive to delay and should not be delayed too much in the wireless network. If link l serves high priority packets that are very sensitive to delay then the wireless card may reduce the unlocking period $T_l$. A shorter unlocking period $T_l$ helps ensure that link l is not prevented from making a transmission attempt for too long a time period. In other words, a shorter time period $T_l$ helps increase the frequency of opportunities for a link l to make an attempt to transmit data.

In another embodiment, the unlocking mechanism can also use an identical and fixed unlocking period T for all links that do not change over time. One example approach for selecting a fixed unlocking time period T for all links is to use the following expression: $T = f(\epsilon)$ where $\epsilon > 0$ is a parameter such that $(1-\epsilon)$ is the network load or the fraction of data throughput capacity that is desired to be achieved, and function $f(.)$ is a non-increasing function. An example choice of the function $f(.)$ may be the following:

$$T = \frac{c}{\epsilon^k}$$

where $c > 0$ is a constant, and $k > 0$ is a constant preferably equal to two. Therefore, in an example situation, the unlocking time period is determined and fixed according the relationship:

$$T = \frac{c}{\epsilon^2}. \quad \text{(Eq. 1)}$$

The mechanism illustrated by FIGS. 9 and 10 can be implemented either in a fully centralized way, or in a fully distributed manner, or in a combination of the two approaches.

In a fully centralized approach, a centralized controller monitors the wireless channels and sends the unlocking signal when necessary. In one example embodiment of a centralized controller, the controller uses a fixed unlocking period T for all links as defined above and sends out an unlocking signal to all wireless cards every T time units. In another embodiment of a centralized controller, the centralized controller monitors only sends out an unlocking signal when a channel has been detected to be locked, and only sends the unlocking signal to the wireless cards which are involved in an active link that caused the channel to be locked.

In a fully decentralized configuration, such as a distributed MAC protocol or a distributed CSMA protocol, a locked channel is detected by individual wireless cards by using a procedure as for example illustrated in FIGS. 9 and 10. In this approach, when a wireless card detects that a channel is locked, it sends out an unlocking signal as for example illustrated in FIG. 11. There are several approaches that can be used to send an unlocking signal. For example, the same wireless channel that is used for data transmission could be used to send an unlocking signal. In another approach, a separate second wireless channel could be used, whereby the second channel is dedicated to sending an unlocking signal. In the case where a wireless channel that is separate from the one used for data transmissions is used to send the unlock signal, then this channel could be used to send the unlocking signal to several wireless channels, or each wireless channel could have its own separate channel to send the unlocking signal. In one embodiment, when sending an unlocking signal for a wireless channel, a wireless card may send the unlocking signal to all wireless cards that are within the transmission range of the originating wireless card for this channel. Another approach is to send the signal only to the wireless cards that are within the transmission range of the originating wireless card for this channel, and limited to those wireless cards that are determined to cause the channel to be locked.

In one example embodiment, the unlocking signal could be sent either in the form of a control packet or a busy tone. The busy tone may be implemented by wireless a signal that is broadcasted in a given frequency range for a short period of time. Whenever another wireless card detects a signal in a given frequency range, then it interprets it as an unlocking signal. Other formats of an unlocking signal can also be used.

It is appreciated that the proposed systems and methods to detect a locked channel and to unlock a channel can be implemented to support and help to improve the delay performance of any CSMA protocol.

In addition, the proposed systems and method for detecting a locked channel and unlocking the same can also be implemented to support any random access protocol, including variants of the CSMA protocol such as CSMA/CD (collision detection) or CSMA/CA (collision avoidance). CSMA/CD is a modification of the CSMA protocol which aims at improving the performance of CSMA protocols by terminating data transmissions as soon as an interference is detected. CSMA/CA is modification of the CSMA protocol which aims at avoiding interference where after finishing the carrier-sensing mechanism a sender card of a wireless link is requiring to send out a request-to-send (RTS) packet before initiating the date transmission. Only if the sender card receives a clear-to-send (CTS) packet from the receiving card does it initiate the data transmission.

More generally, the proposed systems and methods can be implemented to support and help to improve the delay performance of any MAC protocol for wireless networks that can lead to a locked state.

In yet another aspect, it can be appreciated that known joint media access and rate control protocols can be modified to use the principles of unlocking described herein. Details in this regards are explained below.

Wireless networks can be used to send data from an origin node (e.g. which includes a sender wireless card) to a destination node (e.g. which includes a receiver wireless card). Data may generated by a process running on the origin node and is used by another process running on the destination node. If two processes exchange data in such a way, then they generally establish a connection, or communication connection, between the two processes. Generally, such a connection is characterized by the origin and destination nodes that communicate with each other, as well as a path, or route, which defines the sequence of wireless links that are used to forward data of this connection from the origin to the destination node. In a one-hop wireless network, this path consists of a single wireless link. In multihop wireless networks, the data route of a connection can consist of one or more wireless links.

In addition to the MAC protocol that schedules data transmissions, generally a rate control protocol is used in order to control the data throughput and packet delay of data sent along a established connection in a wireless network. The rate control protocol controls the rate at which the origin process is allowed to inject data into the wireless network along the established connection. There exist several known rate control protocols in the art. Different rate control protocols differ in the input variables that are used to determine the data rate allocated to the established connection, the mechanism that is used to update the rate allocated to the established connection over time, and the mechanism that is used to ensure that the data generated for the established connection does not exceed the allocated rate.

By way of background, in the context of rate control protocols, the terms flow and flow rate are used to refer to a given connection between an origin and destination node in a wireless network for which the rate control protocols allocates a data rate and to the data rate allocated to this connection by the rate control mechanism, respectively. For a given flow, the origin node, where the origin process of flow f is executed, is called the source node S(f), and the node where the destination process is being executed is called the destination node D(f).

It can be appreciated that it is desirable to have the MAC and rate control protocol be jointly designed and optimized in order obtain a high performance in terms of data throughput and packet delay. The outcome of such a joint design of the MAC and rate control protocol are referred to as a joint MAC and rate control protocol. Several joint MAC and rate control protocols are known in the art.

Figure 12:
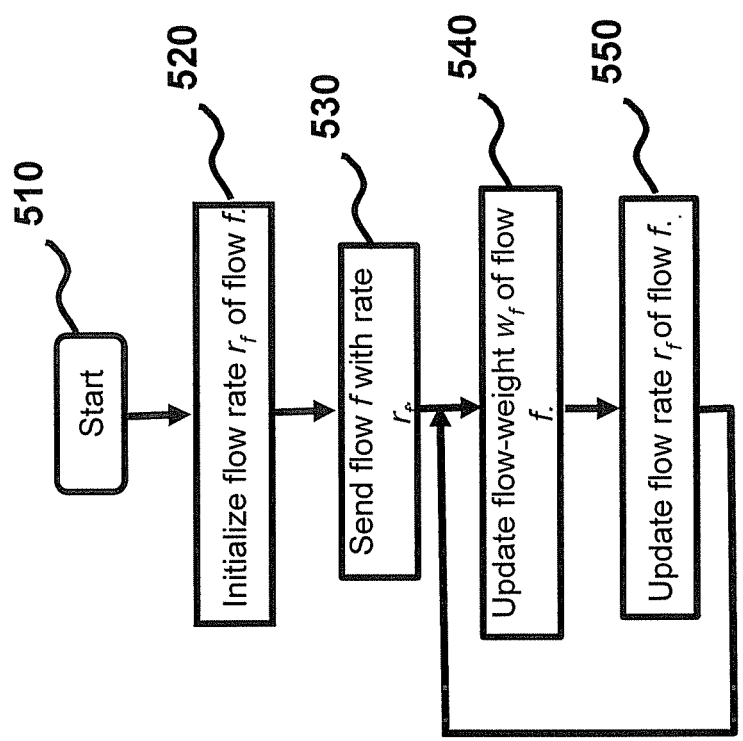
FIG. 12 is a flow diagram illustrating example computer executable instructions for a sender card to set and update a flow rate allocated to a flow used by a modified rate control protocol, as per the benefit of the present disclosure, using a flow-weight that depends on the length of the unlocking period.
Figure 13:
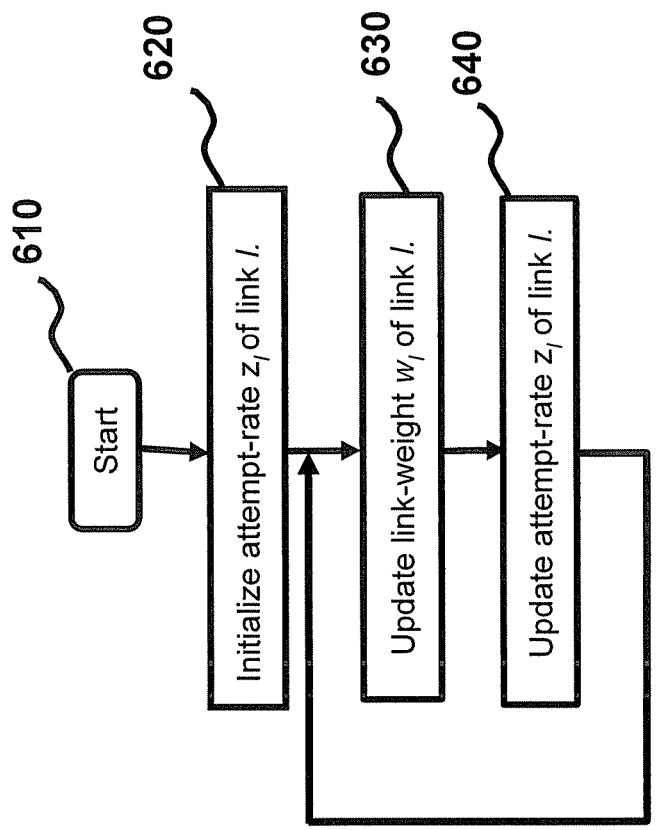
FIG. 13 is flow diagram illustrating example computer executable instructions for a sender card of a wireless link to set and update an attempt-rate used by a modified CSMA protocol, as per the benefit of the present disclosure, using link-weigh that depends on the length of the unlocking period.

Known joint media access and rate control protocols can be modified to use the principles of unlocking, as described herein, in order to improve their performance in terms of data throughput and packet delay. In particular, the proposed systems and methods provide a joint MAC and rate control protocol wherein an unlocking mechanism as illustrated by FIG. 12 or FIG. 13 is used. It is appreciated that values used in the joint MAC and rate control protocol can be generated, obtained, or provided by a wireless node, whereby a wireless node comprises one or more wireless cards 12.

Also by way of background, a utility function is a measure of the service level a flow obtains when it is allocated a particular flow rate by the rate control protocol. It is assumed that the higher the rate allocated to a flow, the higher is the service level (or utility) that this flow receives. The notation $U_f(r_f)$ expresses the value of the utility function for flow f when it is allocated a flow rate equal to $r_f$.

One example use of a joint media access and rate control protocol may be to maximize the network-wide utility function as defined by:

$$U_{net} = \sum_f U_f(r_f) \quad \text{(Eq. 2)}$$

where $U_f(r_f)$ is the utility function of flow f as a function of its throughput $r_f$.

In the following, it is described how the principles of unlocking are used together with a joint MAC and rate control protocol to optimize the network-wide utility function as defined above. An example embodiment of the joint protocol involves the value of the locking period, which is used to detect a locked channel, can also be used as an input to the function that updates the transmission attempt-rate and the flow rate in the MAC and rate control, respectively.

FIG. 12 is a flow-chart illustrating example computer executable instructions for setting the flow rate $r_f$ of a flow f at the source node S(f). In addition to the flow rate, a link-weight is maintained and updated for each flow. The flow weight indicates "how much weight a flow puts on the network". Generally the higher the flow-weight of a flow is, the lower a flow-rate the flow will obtain. The flow-weight $w_f$ of a flow f can be a function of one or more factors. Thus, the flow-weight can by any one or more of a function including, for example: a non-decreasing function of data packet delay, such as the round-trip delay period experienced by data packets of flow f to the destination node D(f); a non-decreasing function of the number of data packets with a certain destination node in the queue of the source node S(f); a non-decreasing function of the number of data packets with certain destination nodes in the queues of a subset of wireless nodes 12 within a certain number of hops from the source node S(f); and, a non-increasing function of the local unlocking periods of the source node S(f) and a set of wireless nodes 12 within a certain number of hops from the source node S(f).

FIG. 13 is a flow-chart illustrating example computer executable instructions for setting the attempt rate of the wireless link/used by the CSMA protocol, where the attempt rate of a wireless link is defined above. In addition to the attempt rate, a link-weight is maintained and updated for each wireless link. The link-weight indicates how much weight a given link should be given in the CSMA protocol that is controlling the data transmission. Generally, the higher the link-weight $w_l$ of a link l, the more opportunity the link will have to initiate a data transmission. The link weight $w_l$ of a link l can be a function of various factors. Such functions include, for example: a function of a queue-size of transmitter and receiver card of link l; a function of packet delays with respect to a certain destination node at the transmitter and receiver cards of link l; and, a non-increasing function of the unlocking period $T_l$ that is used for the wireless link l, etc.

The CSMA protocol, as used with the benefit of this present disclosure, operates with the ability to detect a locked state and use an unlocking mechanism as presented in this disclosure to improve the performance of the CSMA protocol as illustrated by FIG. 12 and FIG. 13.

In the following, a discrete-time model is described for updating the attempt rate of a wireless link where it is assumed that the MAC protocol updates the attempt rate of wireless a link l periodically after a time duration of pre-specified time duration. Each time interval is referred to as a time slot, and use the term time-slot k to refer to the $k^{th}$ time interval.

Turning to FIG. 12, the process begins at block 510 and continues with the operation that a source node S(f) of a flow f first initializes the flow rate $r_f$ at block 520. Preferably the flow rate is initialized by setting $r_f(0)=0$. At any time-slot k, the source node S(f) sends to its queue data packets of flow f with rate $r_f(k)$ (block 530). At the end of the timeslot, the source node S(f) updates the flow-weight $w_f(k)$ of flow f (block 540). Using this updated weight, the source node S(t) updates the flow rate $r_f$ of flow f for timeslot k+1 (block 550). After the update, the operation returns to block 530 for sending data of flow f with the updated rate $r_f$.

According to an example embodiment, the flow rate $r_f(k)$ of a flow f is updated by using $$r_f(k+1)=\mathrm{argmax}_{0 \leq r \leq r_c}[U_f(r)-w_f(k)r] \quad \text{(Eq. 3)}$$

where $U_f(r)$ is the utility function of flow f as a function of its flow rate r, and $w_f(k)$ is the flow-weight of flow f for timeslot k. The update of flow rate of flow f according to Equation 9 decreases the flow rate of flow f as the flow-weight $w_f(k)$ increases, and increases the flow rate $r_f$ of flow f as the utility of the rate increases.

In another aspect, the flow-weight $w_f(k)$ can be a function of one or more factors. Thus, the flow-weight can by any one or more of a function including, for example: a non-decreasing function of data packet delay, such as the round-trip delay period experienced by data packets of flow f to the destination node D(f); a non-decreasing function of the number of data packets with a certain destination node in the queue of the source node S(f); a non-decreasing function of the number of data packets with certain destination nodes in the queues of a subset of wireless nodes 12 within a certain number of hops from the source node S(f); and, a non-increasing function of the local unlocking periods of the source node S(f) and a set of wireless nodes 12 within a certain number of hops from the source node S(f).

The flow-weight $w_f(k)$, for example, may be defined by the following relationship:

$$w_f(k) = \frac{Q_f(k)}{2\alpha_f(k)T_{S(f)}(k)} \quad \text{(Eq. 4)}$$

where $Q_f(k)$ is the number of data packets of flow f that are queued at node S(f) at time slot k for transmission over the first wireless link along the path of flow f. In the above, $T_{S(f)}(k)$ equals the length unlocking period that is used at time t for the first wireless link on the path of flow, and the variable $\alpha_f(k)$ is a function of $T_{S(f)}(k)$. An example choice sets $$\alpha_f(k)=\sqrt{c_\alpha T_{S(f)}(k)} \quad \text{(Eq. 5)}$$

where $C_\alpha$ is a positive constant, preferably equal to two.

Turning to FIG. 13, example computer executable instructions are provided for a transmitter node of a link l to set and update the attempt rate $z_l$ used by link l for the CSMA protocol. Recall that depending on the implementation of the CSMA protocol the attempt rate $z_l$ of link l is differently used. It could be used to define the probability that the sender card of the wireless link initiates a data transmission if the wireless channel used by link l has not been used by any other link that interferes with link l during a sensing period. It also could be used to define a contention window size FIG. 13, starting with block 610, shows that the sender card for the wireless link l first initializes the attempt rate to $z_l(0)=1$.

The sender wireless card or transmitter node then updates the link-weight $w_l(k)$ of the link l to be used for the next timeslot. Using the updated link-weight, the transmitter node updates the attempt-rate to determine $z_l(k+1)$ (block 640), after which the operation goes back to block 630.

According to an example embodiment, using the link-weight $w_l(k)$ of link l as, according to block 630, the attempt rate of the wireless link is updated as follows:

$$z_l(k+1)=e^{w_l(k)} \quad \text{(Eq. 6)}$$

It can also be appreciated that the link weight $w_l(k)$ can be a function of various factors. Such functions include, for example: a function of a queue-size of transmitter and receiver nodes of link l with respect to a destination node; a function of queue-sizes of a subset of links in the wireless network with respect to a certain destination node; a function of packet delays with respect to a certain destination node at the transmitter and receiver nodes of link l, or a subset of links in the wireless network; and, a non-increasing function of the unlocking period T_l that is used for the wireless link l.

An example approach for setting the link-weight $w_l(k)$ is defined by the relationship:

$$w_l(k) = \min\left(w_{max}, \frac{Q_l(k)}{c_w T_l(k)}\right) \quad \text{(Eq. 7)}$$

where $w_{max}$ a positive constant, preferably $c_w=-\log(\beta)$, $T_l(k)$ equals the value of the unlocking period that is used for link l at time t, and $Q_l(k)$ is the maximum differential backlog of link l over all possible destination nodes. The value $Q_l(k)$ can be defined by the expression:

$$Q_l(k)=\max_{n \neq trans(l)}(q_{trans(l),n}(k)-q_{rec(l),n}(k)) \quad \text{(Eq. 8)}$$

where trans(l) is the wireless node where sender card for link l resides, and rec(l) is the wireless node where the receiver card for link l resides, and where for two distinct wireless nodes m and n the value of $q_{m,n}$ represents the number of packets with destination node n in the any queue in any of the wireless cards that reside at node m.

Another exemplary choice for setting the link-weight $w_l(k)$ sets $$w_l(k) = \min\left(w_{d,max}, \frac{D_l(k)}{2T_l(k)}\right) \quad \text{(Eq. 9)}$$

where $w_{d,max}$ is a positive constant, preferably $w_{d,max}=-\log(\beta)$, and where $D_l(k)$ is a maximum moving-average differential delay associated with link l over all possible destination nodes. $D_l(k)$ can be defined by:

$$D_l(k)=\max_{n \neq trans(l)}(D_{trans(l),n}(k)-D_{rec(l),n}(k))$$

where $D_{m,n}$ represents the moving-average delay of packets with destination node n in the queue of node m with m and n as two nodes in the network with $m \neq n$. An exemplary moving-average updates $D_{m,n}(k)$ by using $$D_{m,n}(k+1)=\gamma d_{m,n}(k+1)+(1-\gamma)D_{m,n}(k) \quad \text{(Eq. 10)}$$

where $\gamma$ is a positive constant less than one, and where $d_{m,n}[k]$ is the delay experienced by the $k_{th}$ packet with destination node n at the queue of node m.

Those of ordinary skill in the art appreciate that various changes and modifications can be applied to Equations 1 through 10 without departing from the scope and spirit of the principles described herein.

The following is a discussion of example theoretical results for performance evaluation.

By way of example, an unlocking mechanism as described with respect to FIG. 11 is used in combination with a CSMA protocol for media access control. A theoretical analysis for the example embodiment on the grid topology 100 as illustrated in FIG. 5 shows that for large grid topologies, in order to ensure a uniform throughput per link of $\lambda=(1-\epsilon)\lambda_{max}$ or a load of $\rho=1-\epsilon$, a fixed unlocking period T that is the same for all wireless links in the network and given by $$T = \frac{c}{\epsilon^2},$$

where c>0 is a constant, and preferably c=1.2. The analysis also shows that using these parameters, the resulting average queue-size and hence the packet delay of a link becomes less than $$\frac{c'}{\epsilon^3} = O\left(\frac{1}{\epsilon^3}\right)$$

as $\epsilon$ becomes small, where c'>0 is a constant. Hence, the packet delay can advantageously be upper-bounded by a function that does not depend on the network-size. This is as opposed to the packet delay under a known CSMA protocol, as known without the benefit of this present disclosure, in which the packet delay exponentially increases with the network-size. Therefore, for the example grid topology 100, the proposed systems and methods described herein address the problem of a large packet delay that exists when a known CSMA protocol is used for media access control.

The following is a discussion of example simulation results for the MAC protocol with the mechanism to detect a locked state and to unlock a channel that is presented in this disclosure.

Figure 14:
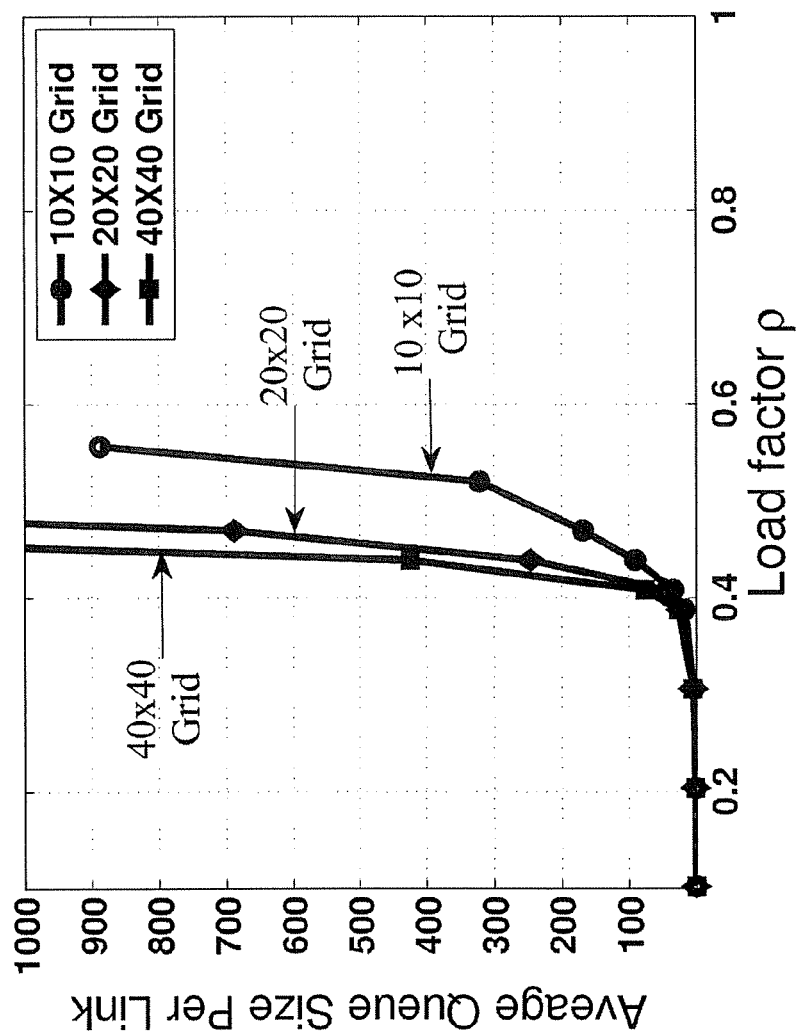
FIG. 14 is an example graph illustrating simulation results using a CSMA protocol as known without the benefit of the present disclosure.
Figure 15:
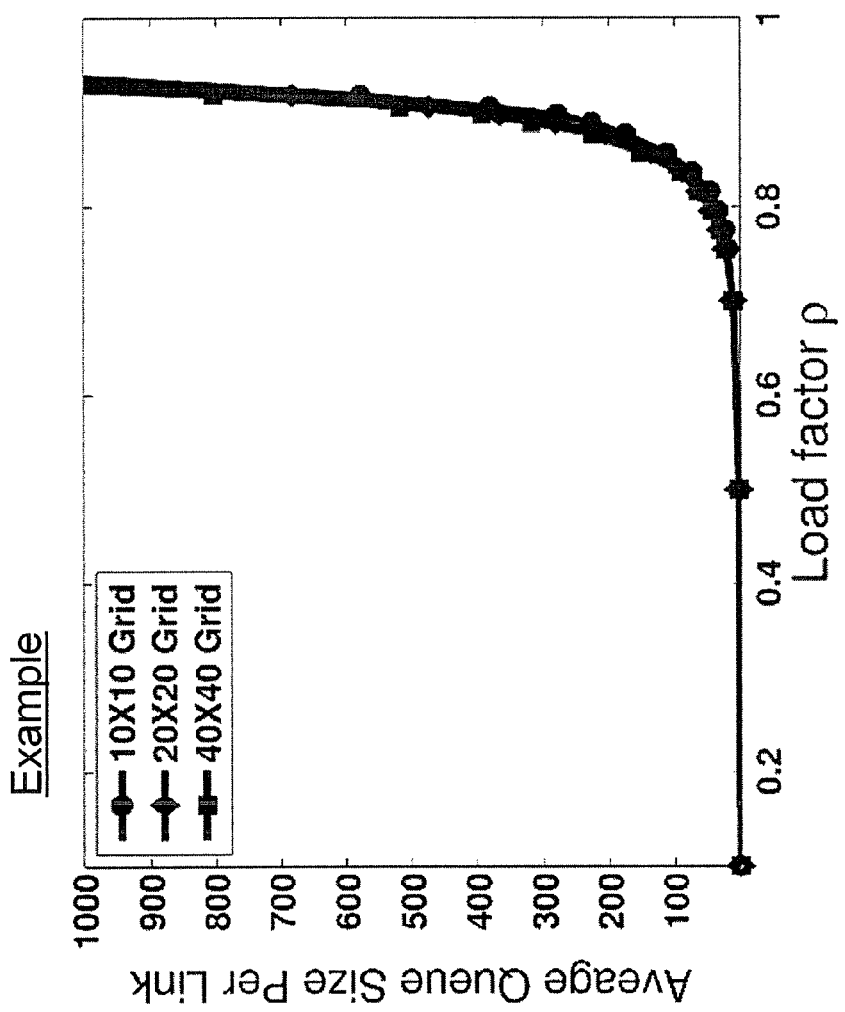
FIG. 15 is an example graph illustrating simulation results using a CSMA protocol in combination with an unlocking mechanism, as described herein.

In FIG. 14, example performance simulation results are provided based on a known CSMA protocol, as used without the benefit of the present disclosure. In FIG. 15, example performance simulation results are provided using the principles of unlocking for a media access control. In both cases, the simulation results are C++ simulation results. The graphs are examples of how the queue size per link (y axis) varies with the load factor (x axis). Variations of the simulations are shown according to the grid size of the wireless network, or simply, the network size.

FIG. 14 illustrates the performance under a known CSMA policy, as known without the benefit of the present disclosure, for the grid topology 100 as illustrated by FIG. 5 with the number of links L∈{100,400,1600}. In other words, the links may be arranged in a 10×10 grid, a 20×20 grid, or a 40×40 grid. The known CSMA policy with uniform attempt rate z is used where $z_l=z$, for all links l. It is assumed that packet arrivals are independent and identically distributed variables (i.i.d.). Thus, during every unit of time, one data packet arrives for any link l, with probability $\lambda$, independent of any other data packet arrival event. Parameter $\lambda$ is the average data packet arrival rate to any link and is given by $\lambda=(1-\epsilon)\lambda_{max}=\rho\lambda_{max}$, where $\rho$ is the network load.

For a given wireless network size L, to support the uniform arrival rate $\lambda$, the attempt-rate z is chosen such that the resulting uniform throughput for any link is $$\mu(z, L) = \lambda_{max}\left(1 - \frac{\epsilon}{2}\right) > \lambda.$$

FIG. 14 shows the resulting average queue-size per link as a function of network load $\rho$ in linear scale under the known CSMA protocol. FIG. 14 illustrates two problems in the performance of the known CSMA protocol.

First, for a given network-size L, for a small load less than 0.3, the queue-sizes are small. However, as the load or load factor increases towards 0.5, the queue-size increases from only few packets to thousands. While the known CSMA policy is known to be throughput-optimal and in principle can support a load $\rho$ close to 1, FIG. 14 shows that in practice, it cannot support loads even as low as 0.5 with a small queue-size. Therefore, the known CSMA protocol cannot reach the 50% utilization without incurring a large packet delay. For the example 20×20 grid topology, the large delay can be computed to be more than 1 second for a packet length of 2346 bytes and a channel rate of 54 Mbs as in 802.11 standards.

Second, FIG. 14 illustrates that for a given load $\rho$, the queue-size shows two different behaviours. If $\rho$<0.4, the queue-size is small and slightly changes with the network-size L. In contrast, for $\rho$>0.4, the queue-size shows a threshold behaviour and drastically and exponentially increases with the network size. For the exemplary case of $\rho$=0.44, the average queue-size almost doubles every time that the network size L increases by a factor of four.

FIG. 15 illustrates the performance of a media access control in accordance with an embodiment of the proposed systems and methods using an unlocking mechanism as described, for example in FIG. 12. The unlocking mechanism operates on top of, or in combination with, the known CSMA protocol, for a grid topology 100 as illustrated in FIG. 5. As in the simulation setup of FIG. 14, data packet arrivals are independent and identically distributed variables, and the average packet arrival rate is the same for all links and equal to $\lambda=(1-E)\lambda_{max}$.

The known CSMA protocol with uniform attempt-rate of z=50 is used. The unlocking period of the unlocking mechanism is set to be constant and equal to (see Equation 1)

$$T\frac{1.2}{\epsilon^2}.$$

FIG. 15 illustrates the resulting average queue-sizes per link as a function of load $\rho$. This example illustrates that the proposed unlocking mechanism described herein is able to improve the performance of CSMA protocols by addressing the two problems present in the performance of the known CSMA protocol as illustrated by FIG. 15. In particular, while the queue-size under the known CSMA becomes on the order of thousands of data packets before reaching a low load of $\rho$=0.5, the proposed systems and methods get much closer to the maximum load of 1 with a small queue-size. In practical terms, for a packet length of 2346 bytes and a channel rate of 54 Mbs as in IEEE 802.11 standards, the average packet delay under the example embodiment can be computed to be only 30 ms and 90 ms for 80% and 85% of channel utilizations, respectively. In contrast, the average delay under the known CSMA policy becomes more than 1 sec before even reaching the 50% utilization.

Second, FIG. 15 demonstrates that the average queue-size and, thus, average delay do not change significantly with the network-size L. In particular, for exemplary 20×20 and 40×40 grid topologies, the average queue-sizes are hardly distinguishable. This is consistent with the example theoretical results presented earlier and confirms that the media access control using an unlocking mechanism, as described herein, mitigates the problems that exist for the known CSMA policy. Thus, the principles of the present disclosure advantageously allows the average packet delay to stay bounded as the network size increases.

The following is a discussion of example simulation results for distributed joint media access control and rate control using busy tones on a randomized topology.

Figure 16:
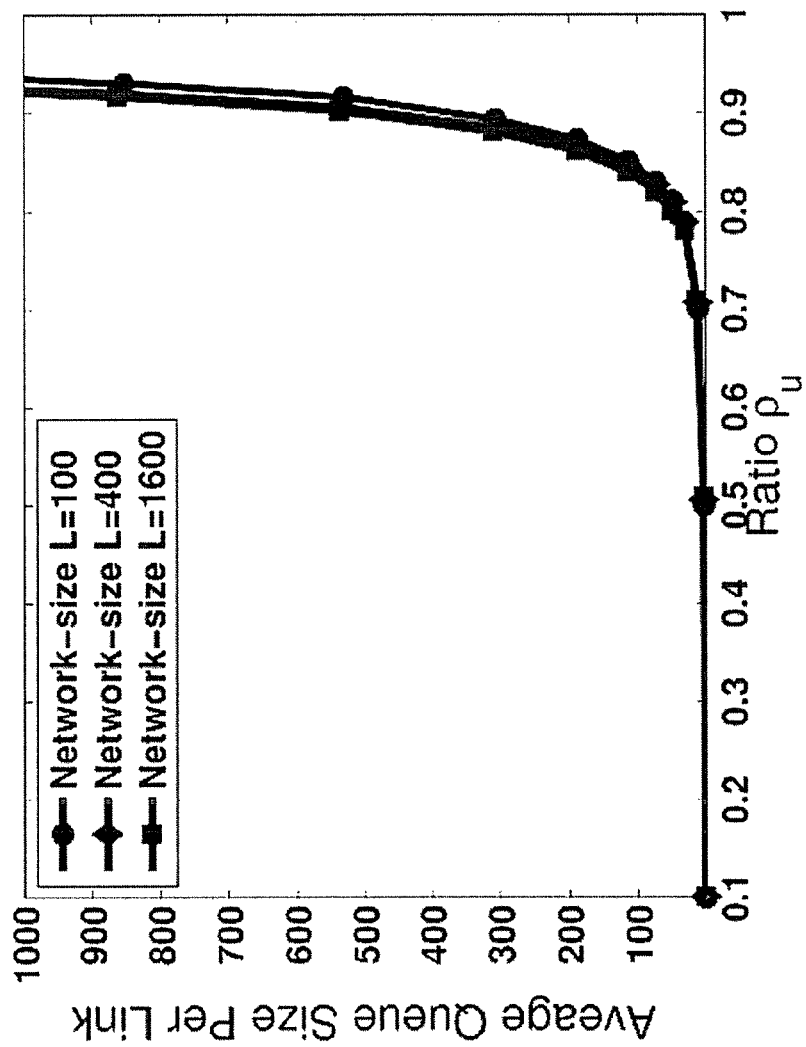
FIG. 16 is an example graph illustrating simulation results using a CSMA protocol in combination with an unlocking mechanism, as described herein, as applied to a randomized wireless network.

Turning to FIG. 16, example simulation results for a joint media access control and rate control are provided in the context of a random geometric interference topology. The three sizes of network topologies have $L \in \{100,400,1600\}$ links, which are randomly distributed over a square area of 10×10, 20×20 and 40×40, respectively. It is assumed that each link/has an interference range R such that it interferes with only those links that are within distance R of link 1. In the simulation, the interference range R is chosen such that every link on the average interferes with six other links.

For media access control, the distributed unlocking mechanism in an example embodiment uses busy tones to send interruptions on top of the known CSMA policy. It is assumed that busy tone delay (e.g. the time it takes a wireless card that is in the transmission range of another wireless card that issues a busy signal, to be able to detect the busy signal) is equal to the expected time it takes to transmit one data packet. Different values for T are used to obtain different values for the expected local unlocking period and to obtain different simulation data points in FIG. 16.

Attempt-rates of links as used by the CSMA protocol are updated in accordance with the principles described with respect to Equation 6, Equation 7, and Equation 8.

The simulation uses an embodiment of the unlocking mechanism as described with respect to in FIG. 13 for rate control as further described in Equations 3, 4, and 5 to maximize a network-wide utility function $U_{net}$.

It is assumed that each link 1 has a logarithmic utility function $U_l(r_l)$ as a function of its throughput $r_l$, and $U_l(r_l)= \log(1+r_l)$.

FIG. 16 also illustrates the average queue-size per link as a function of $\rho_u$, where $$\rho_u = \frac{U_{net}}{U_{opt}}$$

is the ratio of the achieved network-wide utility to the optimum maximal utility $U_{opt}$.

FIG. 16 confirms that the average queue-size and, hence the average delay behaviour, is similar to the one illustrated by FIG. 15.

FIG. 16 also demonstrates that in random topologies, an example of the proposed system and method assigns data packet arrival rates to links in a near-optimal manner. In other words, $\rho_u$ is made close to 1 without incurring a large queue-size, or in effect, a large packet delay. In particular, for a data packet length of 2346 bytes and a channel rate of 54 Mbs, the delay time period can be computed to be about 40 ms to achieve or reach $\rho_u=0.8$, or 80% of optimality.

FIG. 16 also demonstrates that the average queue-size and hence the average delay slightly change with the network-size. Similar to the case of the grid topology 100 under an example embodiment according the media access control described with respect to FIG. 15, in random topologies for a joint media access control and rate control using an unlocking mechanism, packet arrival rates are assigned a value that is near optimum to increase a network-wide utility function with a low packet delay in large multihop wireless networks.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

It will be appreciated that the particular embodiments shown in the figures and described above are for illustrative purposes only and many other variations can be used according to the principles described. Although the above has been described with reference to certain specific embodiments, various modifications thereof will be apparent to those skilled in the art as outlined in the appended claims.

The invention claimed is:

1. A method for controlling transmission of data on a wireless device in a wireless network, the wireless device and another wireless device in the wireless network using a shared communication channel, the method comprising:
   the wireless device monitoring if the shared communication channel is in a locked state, the locked state identified by the wireless device having fewer than a predetermined number of opportunities to initiate a data packet transmission within a predetermined time period;
   when the wireless device detects the locked state, by at least one of monitoring the shared communication channel and by receiving an unlocking signal from the other wireless device, the wireless device unlocking the shared communication channel by stopping transmission of data along the shared communication channel; and
   the wireless device attempting to re-start data transmission approximately when the wireless devices using the shared communication channel detect that the shared communication channel is locked.

2. The method in claim 1 wherein the wireless device detects the locked state by monitoring the shared communication channel and the method further comprising the wireless device transmitting to the other wireless device the unlocking signal to stop transmission of data along the shared communication channel.

3. The method in claim 1 wherein the wireless device is a wireless card comprising a wireless radio, and stopping transmission of data along the shared communication channel comprises stopping transmission of data from the wireless radio.

4. The method in claim 1 wherein the unlocking signal indicates that the shared communication channel is in the locked state and prompts the wireless device to stop transmission of data along the shared communication channel.

5. The method of claim 4 wherein the unlocking signal is generated by the other wireless device or a third party controller in the wireless network, the unlocking signal received by the wireless device.

6. The method in claim 1 further comprising, after detecting the locked state, the wireless device checking one or more conditions before unlocking the shared communication channel.

7. The method in claim 6 wherein the one or more conditions comprise determining if there are one or more data packets queued on the wireless device to be transmitted over the shared communication channel and, if so, the wireless device unlocking the shared communication channel.

8. The method in claim 6 wherein the one or more conditions comprise determining if one or more high priority data packets are queued on the wireless device to be transmitted over the shared communication channel and, if so, the wireless device unlocking the shared communication channel.

9. The method in claim 1 further comprising, after the wireless device stopping transmission of data along the shared communication channel, the wireless device waiting for a random period of time before attempting to re-start data transmission.

10. The method in claim 9, wherein the random period of time is in approximate length to a time period beginning from when one of the wireless devices first detects the shared communication channel is in the locked state and transmits to the other wireless device an unlocking signal to indicate that the shared communication channel is in a locked state and to stop transmission of data along the shared communication channel, and the time period ending when all the wireless devices using the shared communication channel detect that the shared communication channel is locked.

11. The method in claim 2 wherein the wireless device determines if it is authorized to transmit the unlocking signal and, if so, the wireless device transmitting the unlocking signal.

12. The method in claim 1 wherein the wireless network is a multihop wireless network.

13. The method in claim 1 used in combination with a Carrier Sense Multiple Access (CSMA) protocol.

14. The method in claim 1 wherein the predetermined time period is used as an input to update at least one of an attempt rate for a media access control protocol and a flow rate for a rate control protocol.

15. The method in claim 1 wherein the predetermined number of opportunities is used as an input to update at least one of an attempt rate for a media access control protocol and a flow rate for a rate control protocol.

16. A non-transitory computer readable medium for controlling transmission of data in a wireless device in a wireless network, the wireless device and another wireless device in the wireless network using a shared communication channel, the computer readable medium comprising computer executable instructions for:
  the wireless device monitoring if the shared communication channel is in a locked state, the locked state identified by the wireless device having fewer than a predetermined number of opportunities to initiate a data packet transmission within a predetermined time period;
  when the wireless device detects the locked state, by at least one of monitoring the shared communication channel and by receiving an unlocking signal from the other wireless device, the wireless device unlocking the shared communication channel by stopping transmission of data along the shared communication channel; and,
  the wireless device attempting to re-start data transmission approximately when the wireless devices using the shared communication channel detect that the shared communication channel is locked.

17. The non-transitory computer readable medium in claim 16 wherein the wireless device detects the locked state by monitoring the shared communication channel and the computer readable medium further comprising computer executable instructions for the wireless device transmitting to the other wireless device the unlocking signal to stop transmission of data along the shared communication channel.

18. The non-transitory computer readable medium in claim 16 wherein the wireless device is a wireless card comprising a wireless radio, and stopping transmission of data along the shared communication channel comprises stopping transmission of data from the wireless radio.

19. The non-transitory computer readable medium in claim 16 wherein the unlocking signal indicates that the shared communication channel is in the locked state and prompts the wireless device to stop transmission of data along the shared communication channel.

20. The non-transitory computer readable medium in claim 19 wherein the unlocking signal is generated by the other wireless device or a third party controller in the wireless network, the unlocking signal received by the wireless device.

21. The non-transitory computer readable medium in claim 16 further comprising computer executable instructions for, after detecting the locked state, the wireless device checking one or more conditions before unlocking the shared communication channel.

22. The non-transitory computer readable medium in claim 21 wherein the one or more conditions comprise determining if there are one or more data packets queued on the wireless device to be transmitted over the shared communication channel and, if so, the wireless device unlocking the shared communication channel.

23. The non-transitory computer readable medium in claim 21 wherein the one or more conditions comprise determining if one or more high priority data packets are queued on the wireless device to be transmitted over the shared communication channel and, if so, the wireless device unlocking the shared communication channel.

24. The non-transitory computer readable medium in claim 16 further comprising computer executable instructions for, after the wireless device stopping transmission of data along the shared communication channel, the wireless device waiting for a random period of time before attempting to restart data transmission.

25. The non-transitory computer readable medium in claim 24, wherein the random period of time is in approximate length to a time period beginning from when one of the wireless devices first detects the shared communication channel is in the locked state and transmits to the other wireless device an unlocking signal to indicate that the channel is in a locked stated and to stop transmission of data along the shared communication channel, and the time period ending when all the wireless devices using the shared communication channel detect that the shared communication channel is locked.

26. The non-transitory computer readable medium in claim 17 wherein the wireless device determines if it is authorized to transmit the unlocking signal and, if so, the wireless device transmitting the unlocking signal.

27. The non-transitory computer readable medium in claim 16 wherein the wireless network is a multihop wireless network.

28. The non-transitory computer readable medium in claim 16 wherein the computer executable instructions are used in combination with a Carrier Sense Multiple Access (CSMA) protocol.

29. The non-transitory computer readable medium in claim 16 wherein the predetermined time period is used as an input to update at least one of an attempt rate for a media access control protocol and a flow rate for a rate control protocol.

30. The non-transitory computer readable medium in claim 16 wherein the predetermined number of opportunities is used as an input to update at least one of an attempt rate for a media access control protocol and a flow rate for a rate control protocol.

31. The method of claim 1 wherein the wireless device attempts to re-start data transmission after the wireless devices using the shared communication channel have stopped transmitting.

32. The non-transitory computer readable medium of claim 16 wherein the wireless device attempts to re-start data transmission after the wireless devices using the shared communication channel have stopped transmitting.

* * * * *